(12) United States Patent
Seliger et al.

(10) Patent No.: US 9,392,078 B2
(45) Date of Patent: Jul. 12, 2016

(54) REMOTE NETWORK ACCESS VIA VIRTUAL MACHINE

(75) Inventors: Rob Seliger, Winchester, MA (US); George Hartz, Salem, NH (US); Eric Fontana, Shrewsbury, MA (US); David Fusari, Groton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1406 days.

(21) Appl. No.: 11/689,177

(22) Filed: Mar. 21, 2007

(65) Prior Publication Data

US 2007/0300220 A1     Dec. 27, 2007

Related U.S. Application Data

(60) Provisional application No. 60/839,157, filed on Aug. 22, 2006, provisional application No. 60/816,288, filed on Jun. 23, 2006.

(51) Int. Cl.
*G06F 15/173* (2006.01)
*H04L 29/08* (2006.01)
(Continued)

(52) U.S. Cl.
CPC ....... *H04L 67/34* (2013.01); *G06F 8/61* (2013.01); *G06F 8/63* (2013.01); *G06F 9/45537* (2013.01);
(Continued)

(58) Field of Classification Search
CPC .............. H04L 29/08072; H04L 29/06; H04L 29/08144
USPC ........ 709/227, 222, 220, 224; 718/1; 713/172
See application file for complete search history.

(56) References Cited

U.S. PATENT DOCUMENTS 5,754,306 A    5/1998   Taylor et al.
5,961,582 A    10/1999   Gaines .............................. 709/1
(Continued)

FOREIGN PATENT DOCUMENTS

GB    2 378 535     2/2003  ............... G06F 9/46
GB    2 387 254 A   10/2003  ............... G07F 7/10
(Continued)

OTHER PUBLICATIONS

Sugerman, J., Venkitachalam, G., and Lim, B. 2001. Virtualizing I/O Devices on VMware Workstation's Hosted Virtual Machine Monitor. In Proceedings of the General Track: 2002 USENIX Annual Technical Conference (Jun. 25-30, 2001). Y. Park, Ed. USENIX Association, Berkeley, CA, 1-14.*
(Continued)

*Primary Examiner* — Khanh Dinh
(74) *Attorney, Agent, or Firm* — Jessica Meyers; Andrew Smith; Micky Minhas

(57) ABSTRACT

A virtual machine project manager creates a generic, i.e., not user-specific, virtual machine image file. Copies of this image file may be distributed to one or more users, each of whom may then use an automated procedure to generate a user-specific virtual machine image file and, thus, a user-specific virtual machine on his/her remote host computer. The generic virtual machine image file may be distributed on computer-readable media, such as a DVD disks, or the file may be stored on a server and downloaded (such as via the Internet) by the users. Each user also receives or downloads a token, which contains a small amount of user-specific information that is used by the automated procedure to provision the generic virtual machine image file for the particular user. A virtual machine accesses a security token connected to a host computer to automatically authenticate or re-authenticate a user, such as when a virtual private network connection is restarted. Substantially identical session identifiers are used by a host computer and a virtual machine, or by two or more virtual machines and, when communicating with an integrated access server. A file server stores virtual machine images that are accessed by a plurality of host computers.

30 Claims, 27 Drawing Sheets

(51) Int. Cl.
*H04L 29/06* (2006.01)
*G06F 9/445* (2006.01)
*G06F 9/455* (2006.01)

(52) U.S. Cl.
CPC ............ *H04L 29/06* (2013.01); *H04L 63/0272* (2013.01); *H04L 63/08* (2013.01); *H04L 63/168* (2013.01); *G06F 9/44505* (2013.01)

(56) References Cited

U.S. PATENT DOCUMENTS

| | | | |
|---|---|---|---|
| 6,182,136 B1* | 1/2001 | Ramanathan et al. | 709/224 |
| 6,397,242 B1 | 5/2002 | Devine et al. | 709/1 |
| 6,496,847 B1 | 12/2002 | Bugnion et al. | 709/1 |
| 6,704,925 B1 | 3/2004 | Bugnion | 717/138 |
| 6,711,672 B1 | 3/2004 | Agesen | 712/227 |
| 6,725,289 B1 | 4/2004 | Waldspurger et al. | 710/9 |
| 6,735,601 B1 | 5/2004 | Subrahmanyam | 707/200 |
| 6,771,290 B1* | 8/2004 | Hoyle | 715/745 |
| 6,785,886 B1 | 8/2004 | Lim et al. | 718/1 |
| 6,789,156 B1 | 9/2004 | Waldspurger | 711/6 |
| 6,795,966 B1 | 9/2004 | Lim et al. | 718/1 |
| 6,854,009 B1* | 2/2005 | Hughes | 709/220 |
| 6,880,022 B1 | 4/2005 | Waldspurger et al. | 710/9 |
| 6,895,501 B1* | 5/2005 | Salowey | 713/168 |
| 6,944,699 B1 | 9/2005 | Bugnion et al. | 710/269 |
| 6,954,852 B2* | 10/2005 | Burokas et al. | 709/222 |
| 6,961,806 B1 | 11/2005 | Agesen et al. | 711/6 |
| 6,961,941 B1 | 11/2005 | Nelson et al. | 719/319 |
| 7,028,305 B2 | 4/2006 | Schaefer | 719/310 |
| 7,069,413 B1 | 6/2006 | Agesen et al. | 711/207 |
| 7,082,598 B1 | 7/2006 | Le et al. | 717/127 |
| 7,089,377 B1 | 8/2006 | Chen | 711/147 |
| 7,111,086 B1 | 9/2006 | Ecoleston et al. | 710/33 |
| 7,111,145 B1 | 9/2006 | Chen et al. | 711/206 |
| 7,117,481 B1 | 10/2006 | Agesen et al. | 717/120 |
| 7,181,744 B2 | 2/2007 | Lee | |
| 7,397,362 B2* | 7/2008 | Zhang | H04N 1/00204 340/3.1 |
| 7,506,170 B2* | 3/2009 | Finnegan | 713/182 |
| 8,225,314 B2 | 7/2012 | Martins et al. | |
| 8,924,964 B2* | 12/2014 | Kodi | G06F 9/45558 718/1 |
| 2002/0103811 A1 | 8/2002 | Fankhauser et al. | 707/104.1 |
| 2003/0217111 A1 | 11/2003 | McKay | 709/207 |
| 2004/0163087 A1 | 8/2004 | Sandland et al. | 719/310 |
| 2005/0039180 A1* | 2/2005 | Fultheim et al. | 718/1 |
| 2005/0063005 A1 | 3/2005 | Phillips et al. | |
| 2005/0198488 A1 | 9/2005 | Sandland et al. | 713/150 |
| 2005/0225791 A1 | 10/2005 | Schultz et al. | |
| 2006/0041761 A1* | 2/2006 | Neumann et al. | 713/189 |
| 2006/0190489 A1* | 8/2006 | Vohariwatt et al. | 707/104.1 |
| 2007/0054741 A1* | 3/2007 | Morrow et al. | 463/42 |
| 2007/0079307 A1* | 4/2007 | Dhawan et al. | 718/1 |
| 2007/0094659 A1 | 4/2007 | Singh et al. | |
| 2007/0211739 A1* | 9/2007 | Schrock | 370/401 |
| 2008/0301678 A1 | 12/2008 | Bottcher et al. | |
| 2009/0172136 A1* | 7/2009 | Schulz et al. | 709/222 |
| 2012/0110571 A1* | 5/2012 | Smith | G06F 9/445 718/1 |
| 2013/0262629 A1* | 10/2013 | Zawacki | H04L 63/0861 709/217 |

FOREIGN PATENT DOCUMENTS

| | | | | |
|---|---|---|---|---|
| JP | 2006079446 | 3/2006 | ............ | G06F 21/20 |
| KR | 2005 0005317 | 1/2005 | ............ | H04B 1/40 |
| WO | WO 01/96990 A2 | 12/2001 | ............ | G06F 1/00 |

OTHER PUBLICATIONS

Garfinkel, T., Pfaff, B., Chow, J., Rosenblum, M., and Boneh, D. 2003. Terra: a virtual machine-based platform for trusted computing. In Proceedings of the Nineteenth ACM Symposium on Operating Systems Principles (Bolton Landing, NY, USA, Oct. 19-22, 2003). SOSP '03. ACM, New York, NY, 193-206.*

"Providing Windows Applications to Users: Nine Different Theories and Architectures," http://www.brianmadden.com/printable.asp?id=566 Mar. 14, 2006, (Doc# 566) pp. 1-6.

"Active Directory" Active Directory—Wikipedia, the free encyclopedia, http://www.en.wikipedia.org/wiki/Active_Directory Jun. 8, 2006, pp. 1-5.

"Symantec Ghost Solution Suite" Ghost Solution Suite: Product Overview—Symantec Corp http://www.symantec.com/Products/enterprise?c=prodinfo&refId=865&print=Y, Not later than Jun. 9, 2006, p. 1 of 1.

"Symantec Ghost Solution Suite" Data Sheet Systems Administration, May 2006, pp. 1-4.

"Symantec Ghost" Symantec, 2004, pp. 1-6.

"Achieving Endpoint Security With VMware ACE" Vmware, 2006, pp. 1-2.

"Providing Secure, Managed Endpoints on Unmanaged PCs" VMware Secured Managed Endpoint http://www.vmware.com/solutions/desktop/endpoint/html 2006, pp. 1-2.

"Support Hosted Virtual Desktops" Softricity http://www.softricity.com/solutions/virtual-desktops.asp 2006, pp. 1-4.

"What is Virtualization?" VMware Virtualization http://www.vmware.com/virtualization/ 2006, pp. 1-2.

"Virtualization Overview" VMware—White Paper, 2006, pp. 1-11.

"VMware Infrastructure Architecture Overview"—VMware—White Paper, 2006, pp. 1-14.

"Virtualization: Architectural Considerations and Other Evaluation Criteria"—VMware—White Paper, 2005, pp. 1-14.

"Configuring a Primary Desktop Environment" VMware Technical Note, 2005, pp. 1-16.

"Best Practices for Setting Up VMware ACE" VMware Technical Note, 2005, pp. 1-16.

"Implications of Virtualization for Image Deployment" Power Solutions, Oct. 2004, pp. 102-104.

"VMware Takes Virtual Machines Mobil" eWeek Enterprise News and Reviews, http://www.eweek.com/print_article2/0,1217,a=135560,00.asp Sep. 20, 2004, pp. 1-2.

"VMWare ACE—A Method to Distribute Virtual Machines" TechWorld, http://www.techworld.com/reviews/index.cfm?reviewID=332&printerfriendly=1 Sep. 22, 2005, pp. 1-2.

"Better Server Virtualization with Intel Architecture" Intel Virtualization Technology http://www.intel.com/business/bss/products/server/virtualization/htm, 2006, pp. 1-3.

"Stream Desktop Applications" Citrix Systems, http://www.citrix.com/English/ps2/technology/feature.asp?contentID=22714, Not later than Jun. 6, 2006, p. 1 of 1.

"GINA" Wikipedia, the free encyclopedia, http://www.en.wikipedia.org/wiki.GINA May 3, 2006, pp. 1-2.

"Customizing GINA, Part 1" by Keith Brown, MSDN Magazine, May 2005 http://msdn.microsoft.com/msdnmag/issues/05/05/SecurityBriefs/default/aspx?print=true pp. 1-8.

"Customizing GINA, Part 2" by Keith Brown, MSDN Magazine, Jun. 2005 http://msdn.microsoft.com/msdnmag/issues/05/06/SecurityBriefs/default/aspx?print=true pp. 1-8.

"Specify a Replacement GINA Authentication DLL" WinGuides.com, http://www.winguides.com/registry/display.php/945/ Apr. 3, 2002, p. 1 of 1.

"GINA Chaining with the MetaFrame Password Manager Agent," Citrix.com, http://support.citrix.com/article/CTX103185&printable=true Sep. 28, 2004, pp. 1-2.

"RSA SecurID 6.0 Agent Replaces the Standard Windows GINA," Citrix.com, http://support.citrix.com/article/CTX107408&printable=true May 16, 2006, p. 1 of 1.

"Windows Login," Raak Technologies, http://www.raaktechnologies.com/solutions/windows_login.html, Not later than May 31, 2006, pp. 1-3.

"The System Preparation Tool (Sysprep) in Windows XP: an Overview," Killian's Guide http://66.102.7.104/search?q=cache:vBw-crltpTgJ:www.geocites.com/kilian0072002/sys . . . Feb. 28, 2005, pp. 1-22.

(56) References Cited

OTHER PUBLICATIONS

"Windows XP: Automating Deployment Using Sysprep," myITforum.com, http://www.myitforum.com/articles/15/print_view.asp?id-4392 Mar. 31, 2003, pp. 1-8.
"Full Version: Use Sysprep.exe Tool to Automate an Install of XP," 4peeps.com Forums, http://4peeps.com/ivb/lofiversion/index.php/t2638.html Jan. 15, 2003, pp. 1-3.
"Using Imaging to Deploy Microsoft Windows Server 2003," Power Solutions, Nov. 2003, pp. 84-87.
"Using Sysprep to Create XP Pro Images," UEA, http://www.uea.ac.uk/itcs/software/xp/xp-sysprep.html Aug. 11, 2001, pp. 1-5.
"How to Use the Sysprep Tool to Automate Successful Deployment of Windows XP," http://support.microsoft.com/default.aspx?scid=kb;en-us;302577 Apr. 14, 2005, pp. 1-5.
"How to Use Sysprep: An Introduction," Microsoft TechNet, http://www.microsoft.com/technet/prodtechnol/winxppro/deploy/introduction/mspx?pf=true Nov. 29, 2001, pp. 1-2.
"How to Use Sysprep in Factory Mode," Microsoft TechNet, http://www.microsoft.com/technet/prodtechnol/winxppro/deploy/factorymode.mspx?pf=true Nov. 29, 2001, pp. 1-3.
How to Use Sysprep to Automate Mini-Setup, Microsoft TechNet, http://www.microsoft.com/technet/prodtechnol/winxppro/deploy/minisetup.mspx?pf=true Nov. 29, 2001, p. 1 of 1.
How to Use Sysprep to Restore the Computer to an End-User-Ready State, Microsoft TechNet http://www.microsoft.com/technet/prodtechnol/winxppro/deploy/restore.mspx?pf=true Nov. 29, 2001, p. 1 of 1.
"How to Prepare Images for Disk Duplication with Sysprep," Microsoft TechNet, http://www.microsoft.com/technet/prodtechnol/winxppro/deploy/duplication.mspx?pf=true Nov. 29, 2001, pp. 1-2.
"How to Use Sysprep for Auditing Installations," Microsoft TechNet http://www.microsoft.com/technet/prodtechnol/winxppro/deploy/auditing.mspx?pf=true Nov. 29, 2001, p. 1 of 1.
"Kerberos Tickets and How They Work," http://www.upenn.edu/computing/pennkey/use/tktmgr.html, Not later than Jul. 30, 2004, pp. 1-2.
"Kerberos Security in Windows Server 2003,"—Ticket Granting Ticket (TGT) http://www.computerperformance.co.uk/w2k3/Security_Kerberos.html, Not later than Apr. 21, 2006, pp. 1-4.
"Kerberos Building Blocks," http://docs.hp.com/en/T1417-90001/ch01s03.html 2006, pp. 1-6.
"How a Kerberos Logon Works in Windows 2000," Reynolds, Nathan; http://www.serverwatch.com/tutorials/print.php/2176201 Jan. 3, 2001, pp. 1-4.
"VMware ACE—The Assured Computing Environment for the Enterprise," VMware Ace Product DataSheet, pp. 1-2, 2006.
"VMware ACE—The Assured Computing Environment for the Enterprise," Administator's Manual, (Selected Pages), 2006.
Image: ActiveDirectoryMMC.png, Wikipedia, May 1, 2006.
Roudebush, Bob, "vThere—A Second Look" RoudyBob.net, [Online] Jul. 31, 2006; Retrieved from Internet: http://www.roudybob.net/?p=307.
Keaney, K., et al., "Virtual Playgrounds: Managing Virtual Resources in the Grind" Parallel and Distributed Processing Symposium, 2006, pp. 1-8.
Lopez, D.R., et al., "Providing Secure Mobile Access to Information Servers with Temporary Certificates" Computer Networks, vol. 31, No. 21, Nov. 10, 1999, pp. 2287-2292.
Kozuch, M., et al., "Internet Suspend/Resume" Fourth IEEE Workshop on Mobile Computing Systems and Applications [Online] Jun. 1, 2002; Retrieved from Internet: www.intel-research.net/publications/Pittsburgh/110620030912_88.pdf.
Figueiredo, R.J. et al., "A Case for Grid Computing on Virtual Machines" Proceedings of the 23$^{rd}$ International Conference on Distributed Computing Systems, vol. 23, May 19, 2003, pp. 550-559.
Ming, Zhao, et al., "Distributed File System Support for Virtual Machines in Grid Computing" High Performance Distributed Computing, Jun. 4, 2004, pp. 202-211.
Bressoud, T., et al., "Seamless Mobile Computing on Fixed Infrastructure" Computer, IEEE Service Center, vol. 37, No. 7, Jul. 2004, pp. 65-72.
Dongyan, Xu, et al., "Virtual Distributed Environments in a Shared Infrastructure" Computer, IEEE Service Center, vol. 38, No. 5, May 2005, pp. 63-39.
England, et al., "Virtual Machines for Enterprise Desktop Security" Information Security Technical Report, Dec. 5, 2006, p. 193-202.
Norton, R.L., "Using Virtual Linux Servers" Computer, IEEE Service Center, vol. 35, No. 11, Nov. 2002, pp. 106-107.
Authorized Officer, Steffen Beyer, International Searching Report and Written Opinion, PCT/US2007/069509, Jul. 4, 2008.
Keahey, et al., "Contextualization: Providing One-click Virtual Clusters," University of Chicago, 8 pages, Dec. 7, 2008.
Bradshaw, et al., "A Scalable Approach to Deploying and Managing Appliances," Teragrid 2007 Conference, pp. 1-6, 2007.
Sapuntzakis, et al., "Virtual Appliances in the Collective: A Road to Hassle-Free Computing," Computer Systems Laboratory, Stanford University, pp. 55-60, May 18, 2003.

* cited by examiner vThere™ Image Creator – [1.0.495 Test]

File   Project   Window   Help

Launch Project   Edit Settings   Backup Project...   Create ISO   Delete Project....

Project Name: 1.0.495 Test

Description: This project is a new gold image with the new partitioning scheme and split disk images.

Date Last Used: 6/9/2006 3:11:52 PM

Project Ancestry

Created From: Split Disk Gold Image

From Date: 6/9/2006 3:11:52PM

From Description: This project is a new gold image with the new partitioning scheme and split disk images System Information Max Drive Size: 15360mb Partition Size: Partition sizes are not reported yet Memory: 384mb Domain:

Organization:

Backup

Date Created: <none>

Description:

Fig. 5B

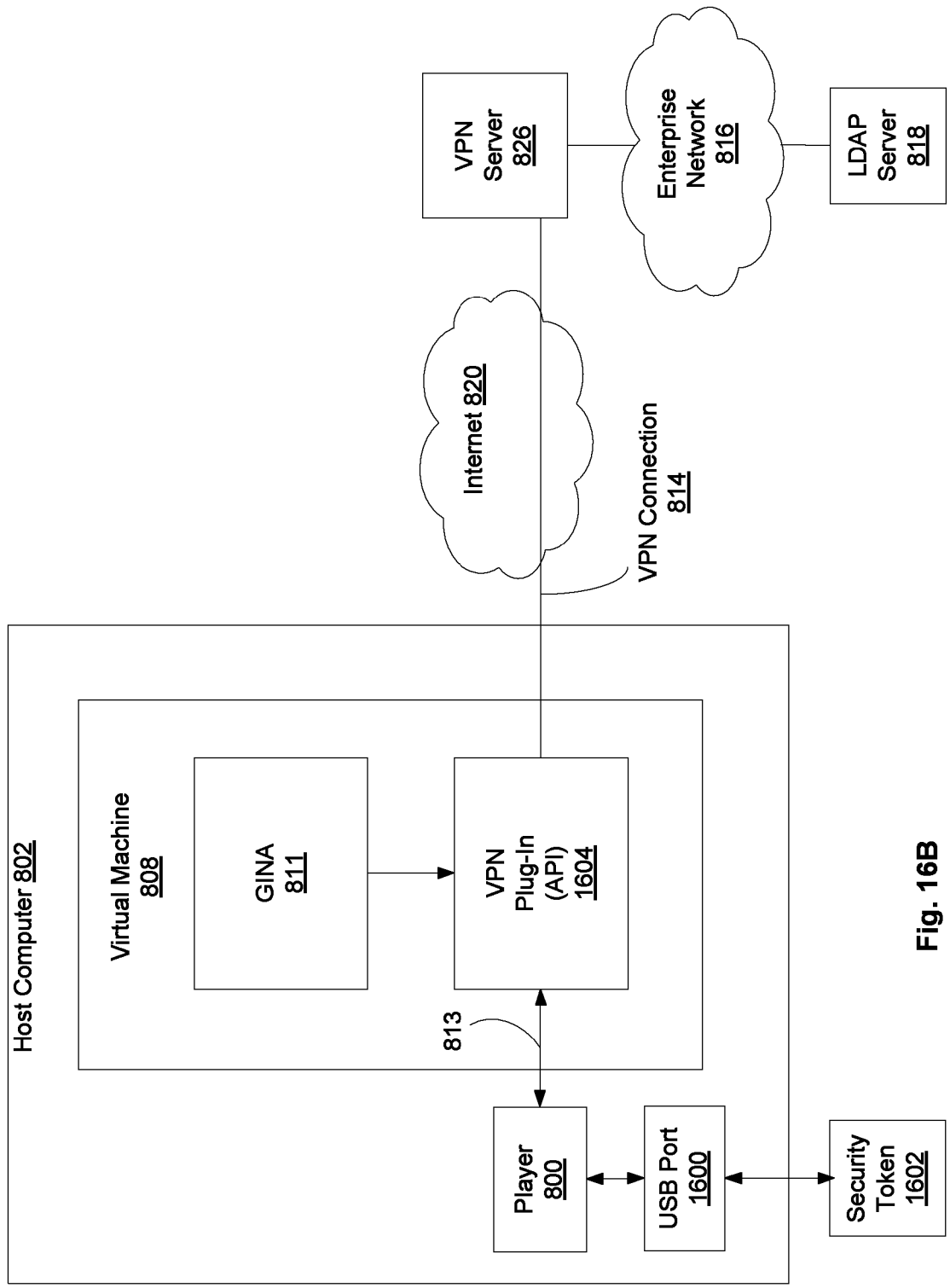

REMOTE NETWORK ACCESS VIA VIRTUAL MACHINE

CROSS REFERENCE TO RELATED APPLICATIONS

This application claims the benefit of U.S. Provisional Patent Application No. 60/839,157, filed Aug. 22, 2006, titled "Remote Network Access Via Virtual Machine," and U.S. Provisional Patent Application No. 60/816,288, filed Jun. 23, 2006, titled "Remote Network Access Via Virtual Machine," the contents of which are hereby incorporated by reference herein.

TECHNICAL FIELD

The present invention relates to virtual machines used to remotely access enterprise computer networks and, more particularly, to methods and systems for provisioning such virtual machines for users.

BACKGROUND ART

Many organizations, such as corporations, hospitals and universities, maintain enterprise computer networks to interconnect workstation computers, printers, storage devices and other network resources. Such networks facilitate users' access to data and application programs stored on the network or on other workstations. Such networks also facilitate communication, such as by electronic mail (e-mail), among workstation users.

Some organizations allow their users to connect remote workstations, such as home computers, to their enterprise networks. Such remote connections facilitate working from home or from some other "off campus" locations. For example, a doctor may have admitting privileges at several hospitals. The doctor may find it convenient to be able to access patient data at all of these hospitals from one or more locations, such as his/her primary clinical office or from a workstation in any of the hospitals.

Information technology (IT) organizations prefer to manage workstations connected to their respective enterprise networks. For example, these organizations typically control which operating system and which version of the operating system executes on each workstation. Managed workstations typically include prescribed anti-virus software. IT policy may also prohibit users from installing unapproved software or hardware on users' workstations to minimize the likelihood of malicious software being installed on the workstations. In general, IT organizations standardize the workstations to facilitate maintaining and upgrading the workstations.

The desire to be able to access an enterprise network from remote locations and the simultaneous desire to tightly manage all workstations connected to the enterprise network pose problems. A virtual private network (VPN) connection can be used to interconnect a remote user with an enterprise network. A VPN connection is a secure computer network connection between two points. The VPN connection is carried over another network, typically a public wide area network (WAN), such as the Internet. Communications between the end points of a VPN connection are typically encrypted, so their contents cannot be ascertained by unauthorized nodes along the WAN. Software at the endpoints operates to establish a network link (independent of the carrying WAN) between the endpoints. Thus, a VPN connection makes the exemplary workstation appear as a node on the enterprise network.

However, connecting a remote user's computer to an enterprise network via a VPN connection poses problems. For example, such a connection can expose the enterprise network to malicious software on the user's computer.

One solution to this problem involves executing a managed virtual machine on a user's remote (host) computer. The virtual machine provides protection against malicious software that might execute on the host computer. A virtual machine is instantiated (created) on a host computer by a virtualization program and a virtual machine image file. However, the virtual machine image file must be provisioned (customized) for each remote user. Creating and distributing such user-specific virtual machine image files is time consuming and expensive.

SUMMARY OF THE INVENTION

An embodiment of the present invention provides a method of provisioning a customized virtual machine image to a user on a host computer so as to permit establishment of a virtual machine on the host computer. The method of this embodiment includes providing a virtual machine image for loading onto the host computer. This image has an operating system and as yet is not customized to the user. The method additionally includes providing previously generated customized configuration data from a source outside of the image for use by the operating system.

In further related embodiments, the method also includes determining additional configuration data from predefined rules and providing the additional data for use by the operating system. Optionally, the additional configuration data includes a memory size associated with the virtual machine. Alternatively or in addition, the virtual machine image also includes instructions and data for establishing a VPN connection between the virtual machine and a computer environment. Optionally, the host computer is unmanaged. Also alternatively or in addition, the virtual machine image includes computer instructions establishing an automated mini-setup procedure for the operating system and the customized configuration data include data that are provided as answers to the automated mini-setup procedure.

In further related embodiments, the virtual machine image includes computer instructions establishing an authentication component to implement an authentication policy of an interactive logon model, such component prompting for user-supplied credentials necessary for establishing the VPN connection. Optionally, the authentication component also causes generation of a log file external to the virtual machine, the log file containing diagnostic information concerning at least one application running in the virtual machine. The at least one application may include the authentication component itself, a VPN monitor, or a VPN helper or any combination of these applications. Also alternatively or in addition, the virtual machine image also includes instructions for causing log out from the operating system in response closing of a user interface window related to the virtual machine.

In another embodiment, the invention provides a method of providing access by a remote computer to a computing environment, such environment having a virtual private network connection. The method of this embodiment includes providing a virtual machine image for loading onto the remote computer. This image (i) permits establishment of a virtual machine on the remote computer, (ii) has an operating system, (iii) includes instructions and data for establishing a VPN connection between the virtual machine and a computer environment, and (iv) is as yet not customized to a specific user. The method also includes providing previously generated customized configuration data from a source outside of the image to the operating system. The configuration data permits the virtual machine to log in to the environment and become registered onto a domain of the environment.

The further related embodiments generally correspond to those discussed above. In further related embodiments, the method also includes determining additional configuration data from predefined rules and providing the additional data for use by the operating system. Optionally, the additional configuration data includes memory size associated with the virtual machine.

Optionally, the host computer is unmanaged. Also alternatively or in addition, the virtual machine image includes computer instructions establishing an automated mini-setup procedure for the operating system and the customized configuration data include data that are provided as answers to the automated mini-setup procedure.

In further related embodiments, the virtual machine image includes computer instructions establishing an authentication component to implement an authentication policy of an interactive logon model, such component prompting for user-supplied credentials necessary for logging onto the VPN connection. Optionally, the authentication component also causes generation of a log file external to the virtual machine, the log file containing diagnostic information concerning at least one application running in the virtual machine. The at least one application may include the authentication component itself, a VPN monitor, or a VPN helper or any combination of these applications. Also alternatively or in addition, the virtual machine image also includes instructions for causing log out from the operating system in response closing of a user interface window related to the virtual machine.

Another embodiment of the invention provides a computer program product. The product includes a computer-readable medium on which is stored a virtual machine image for loading onto a host computer. The image has an operating system that is not as yet customized to a user. In a further related embodiment the virtual machine image includes computer instructions for causing customization of the operating system to a particular user according to configuration data from a source other than the computer-readable medium.

An embodiment of the invention provides a method of accessing a printer that is available through a host computer. The host computer has a printer driver and a host operating system, and the host computer executes a virtual machine. In response to a print request, the method includes producing an intermediate description of the print request and passing the intermediate description from the virtual machine to the printer driver.

In related embodiments, the method also includes storing the intermediate description on the host computer. The intermediate description may be in a portable document format (PDF). The intermediate description may be at least one command, including at least one graphic device interface (GDI) command.

Another embodiment of the invention provides a computer printing system. The system includes a host computer executing a real printer driver. The system also includes a virtual machine operating within the host computer. The virtual machine executes a virtual printer driver. The virtual printer driver is operative, in response to a print request, to produce an intermediate description of the print request and to pass the intermediate description to the real printer driver.

In related embodiments, the intermediate description includes a file stored on the host computer. The file may be a portable document format (PDF) file. The intermediate description may include at least one command. The at least one command may include at least one graphic device interface (GDI) command.

An embodiment of the invention provides a method of automatically obtaining at least one user credential. The method includes connecting a security token to a port of a host computer and executing a virtual machine on the host computer. From within the virtual machine, the port is accessed and data associated with at least one user credential related to a user is read from the security token. Also from within the virtual machine, the read data is used to log the user into an operating system executed by the virtual machine.

Another embodiment of the invention provides a method of automatically obtaining at least one user credential. The method includes connecting a security token to a port of a host computer and executing a virtual machine on the host computer. From within the virtual machine, the port is accessed and data associated with at least one user credential related to a user is read from the security token. The read data is used to establish a network connection between the virtual machine and a server.

Yet another embodiment of the invention provides a method of method of automatically obtaining at least one user credential. The method includes connecting a security token to a port of a host computer. The method includes executing a virtual machine on the host computer and executing a virtual machine player on the host computer. From within the player, the port is accessed and data associated with at least one user credential related to a user is read from the security token. Also from within the virtual machine, the player is accessed to obtain the read data.

In related embodiments, from within the virtual machine, the obtained data is used to log the user into an operating system executed by the virtual machine. In another related embodiment, from within the virtual machine, the obtained data is used to establish a network connection between the virtual machine and a server.

Another embodiment of the invention provides a method of automatically obtaining at least one user credential. The method includes executing a host operating system on a host computer and within the host operating system, caching at least one user credential related to a user who is logged into the host operating system. The host computer executes a virtual machine. From within a virtual machine player, the at least one cached user credential is obtained from the host operating system, and the obtained at least one user credential is used to log the user into an operating system executed by the virtual machine.

An embodiment of the invention provides a method of establishing parallel sessions between a host computer and an integrated access server and between a virtual machine being executed on the host computer and the integrated access server. The method includes using a first session identifier to establish a session between the host computer and the integrated access server and using a second session identifier, substantially identical to the first session identifier, to establish a session between the virtual machine and the integrated access server.

In related embodiments, on the host computer, the first session identifier is generated, based at least in part on identification data associated with the host computer. Information about the identification data associated with the host computer is communicated from the host computer to the virtual machine. The communicated information is used to generate the second session identifier. The identification data associated with the host computer may be a media access control (MAC) address of the host computer.

Another embodiment of the invention provides a method of establishing parallel sessions between a first virtual machine being executed on a host computer and an integrated access server and between a second virtual machine being executed by the host computer and the integrated access server. The method includes using a first session identifier to establish a session between the first virtual machine and the integrated access server and using a second session identifier, substantially identical to the first session identifier, to establish a session between the second virtual machine and the integrated access server.

In related embodiments, identification data associated with the host computer is communicated from the host computer to the first virtual machine. The communicated identification data is used to generate the first session identifier. The identification data associated with the host computer is communicated from the host computer to the second virtual machine. In addition, the communicated identification data is used to generate the second session identifier.

The identification data associated with the host computer may be a media access control (MAC) address of the host computer. Communicating the identification data from the host computer to the first virtual machine may include executing a virtual machine player on the host computer.

Yet another embodiment of the invention provides a method of coordinating an access request from a computer to a first integrated access server and an access request from the computer to a second integrated access server, wherein the first and the second integrated access servers maintain distinct universes of patient identifiers. The method includes receiving a patient identifier that identifies a patient within the universe of patient identifiers maintained by the first integrated access server and sending the received patient identifier to the first integrated access server. The method also includes mapping the received patient identifier into a second patient identifier that identifies the same patient within the universe of patient identifiers maintained by the second integrated access server and sending the second patient identifier to the second integrated access server.

In related embodiments, the method may include executing a virtual machine on a computer. Sending the second patient identifier may include setting the second patient identifier from the virtual machine to the second integrated access server.

An embodiment of the invention provides a method of executing a virtual machine in a network that includes a plurality of host computers interconnected to a file server. The method includes storing a plurality of virtual machine images on the file server and loading a selected one of the plurality of virtual machine images from the file server onto a first selected one of the host computers. The method also includes executing the loaded virtual machine image on the first selected one of the host computers.

In related embodiments, storing the plurality of virtual machine images on the file server may include storing a plurality of generic virtual machine images on the file server. Optionally, after loading the selected one of the plurality of virtual machine images from the file server onto the first selected one of the host computers, the method may also include automatically provisioning the virtual machine on the host computer.

In further related embodiments, the method includes suspending execution of the virtual machine on the first selected one of the host computers and storing information about the suspended virtual machine on the file server. Suspending execution of the virtual machine may include suspending execution of the virtual machine in response to a user command issued on the first selected one of the host computers or in response to information stored on the file server or in response to a remote procedure call.

In yet further related embodiments, the method includes loading the information about the suspended virtual machine from the file server onto a second selected one of the host computers, which is different than the first selected one of the host computers. The suspended virtual machine may resume execution on the second selected one of the host computers or on the file server.

The information about the suspended virtual machine may be loaded from the file server onto a compute server and execution of the suspended virtual machine may be resumed on the compute server.

Information about at least one other suspended virtual machine may be loaded from the file server onto the compute server and execution of the at least one other suspended virtual machine may be resumed on the compute server.

Optionally, the virtual machine on the first selected one of the host computers may be automatically provisioned. Storing the plurality of virtual machine images on the file server may include storing a plurality of generic virtual machine images on the file server, and the information about the suspended virtual machine may include information about differences between a current state of the virtual machine and one of the generic virtual machine images.

Optionally, storing the plurality of virtual machine images on the file server may include storing a plurality of generic virtual machine images on the file server. After loading the selected one of the plurality of virtual machine images is loaded from the file server onto the first selected one of the host computers, the virtual machine on the host computer may be automatically provisioned. After provisioning the virtual machine, execution of the virtual machine on the first selected one of the host computers may be suspended, and information about differences between a current state of the virtual machine and one of the generic virtual machine images may be stored on the first selected one of the host computers.

BRIEF DESCRIPTION OF THE DRAWINGS

The invention will be more fully understood by referring to the following detailed description in conjunction with the accompanying drawings, of which:

FIGS. 5A-B depict an exemplary user interface to one of the components of FIG. 3, in accordance with one embodiment of the present invention;

FIG. 16B is a block diagram of a virtual machine accessing a security token, in accordance with another embodiment of the present invention;

DETAILED DESCRIPTION OF SPECIFIC EMBODIMENTS

The contents of U.S. Provisional Patent Application No. 60/839,157, filed Aug. 22, 2006, titled "Remote Network Access Via Virtual Machine," and U.S. Provisional Patent Application No. 60/816,288, filed Jun. 23, 2006, titled "Remote Network Access Via Virtual Machine," are hereby incorporated by reference herein.

DEFINITIONS

As used in this description and the accompanying claims, the following terms shall have the meanings indicated, unless the context otherwise requires:

A "virtual machine" (sometimes herein called "VM") is a self-contained software environment on a host computer that simulates a computer separate from the host computer, providing at least a degree of system independence from the hardware and software environment of the host computer, including the operating system of the host computer.

Virtual Machine

Figure 1:
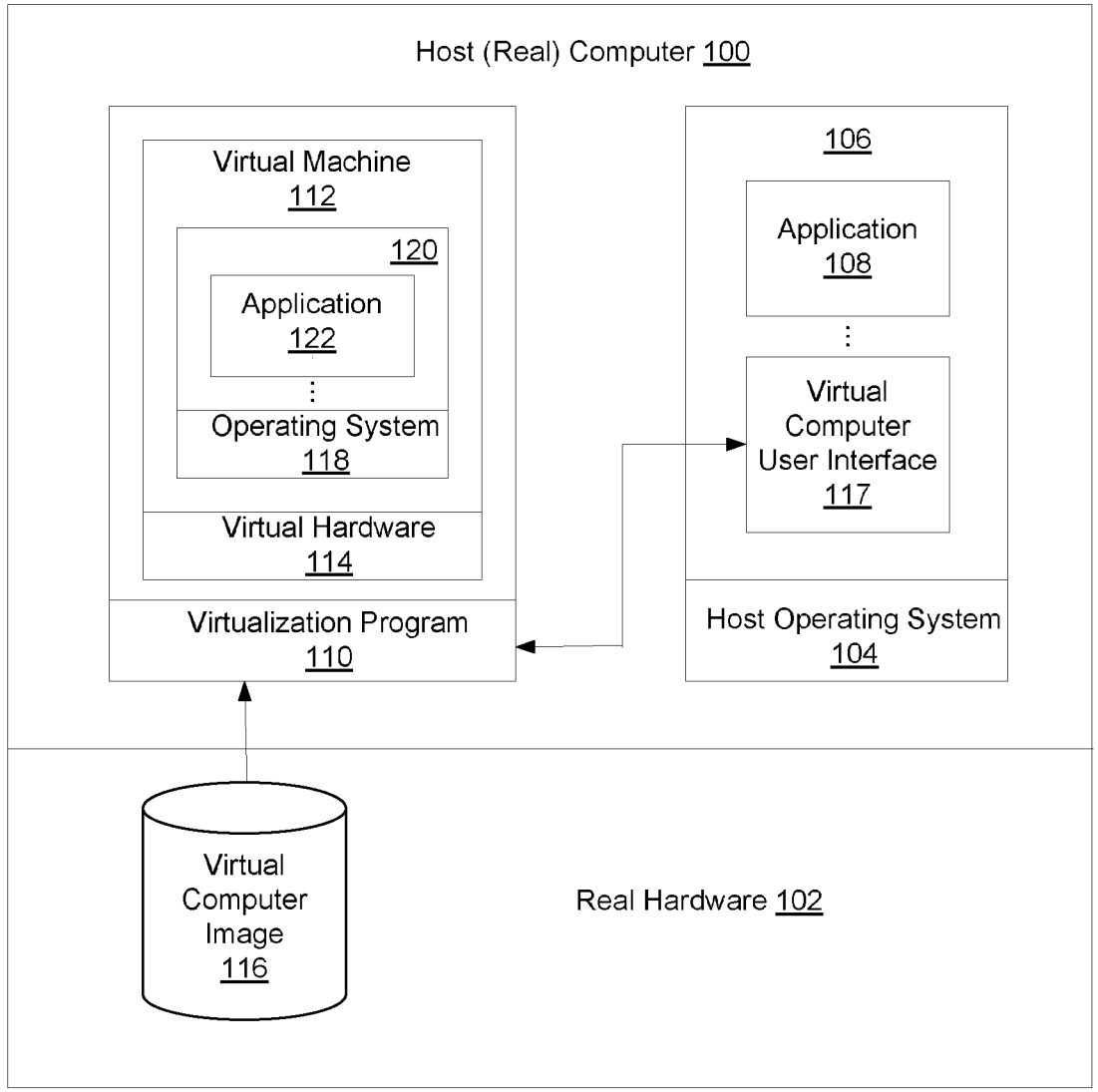
FIG. 1 is block diagram of a virtual machine operating within a real computer, according to the prior art.

A virtual machine simulates actual computer hardware. FIG. 1 is block diagram of a virtual machine operating within a real computer, according to the prior art. A host computer 100, such as a personal computer, includes real hardware 102, such as a basic input/output system (BIOS), one or more central processing units (CPUs), memory, one or more disk drives and, optionally, other peripheral devices. The host computer 100 executes a host operating system 104, such as the Windows XP operating system available from Microsoft Corporation, Redmond, Wash. Alternatively, other operating systems, such as Linux, can be used. The host operating system controls the real hardware 102 and provides an environment 106 in which one or more application programs, such as application 108, can execute. The host operating system provides an interface between the application 108 and the real hardware 102. If the host computer 100 is appropriately equipped, such as with a network interface card (NIC), the host operating system can establish a network connection to another computer.

A "virtualization program" 110, is a program that executes on the host (real) computer 100, typically independently of the host operating system 104. The virtualization program creates an environment 112, a "virtual machine" 112 (defined above), in which other software can be executed. The virtualization program 110 simulates operation of a computer. For example, the virtualization program 110 provides virtual hardware 114, including a BIOS, CPU(s), memory, disk drive(s) and optionally other peripherals to software that executes on the virtual machine 112.

The configuration of the virtual machine 112, such as the CPU model, amount of memory, initial contents of the memory, number of disk drives and their contents, are stored in a virtual machine image file 116. Upon beginning execution, the virtualization program 110 reads the virtual machine image file 116 and creates the virtual machine 112 according to information in the virtual machine image file 116. Exemplary virtualization programs 110 are available from VMware, Inc., Palo Alto, Calif.; Parallels, Inc., Herndon, Va.; and Microsoft, Inc., Redmond, Wash.

The virtualization program 110 may provide a virtual machine user interface 117, which executes as an application in the environment 106 created by the host operating system 104. The virtual machine user interface 117 typically communicates with the virtualization program 110, such as to specify which virtual machine image file 116 the virtualization program 110 is to use to create the virtual machine 112. Once the virtual machine 112 is created, the virtual machine user interface 117 displays a window which displays outputs from the virtual machine 112 and accepts user inputs for the virtual machine 112.

The virtual machine 112 typically executes software just as a real computer executes software. For example, the virtual machine 112 typically executes an operating system 118. The operating system 118 executed by the virtual machine 112 need not be the same operating system or version as the host operating system 104 executed by the host computer 100. The operating system 118 executed by the virtual machine 112 creates an environment 120 in which one or more application programs, such as application 122, can execute.

The virtualization program 110 simulates interactions between the software, such as the operating system 118 and the applications 122, that executes on the virtual machine 112 and the virtualized hardware 114, such as disk drives and network interface cards (NICs). Thus, the software executed by the virtual machine 112 has a degree of isolation from software executed by the host computer 100.

Provisioning a Virtual Machine

Figure 2:
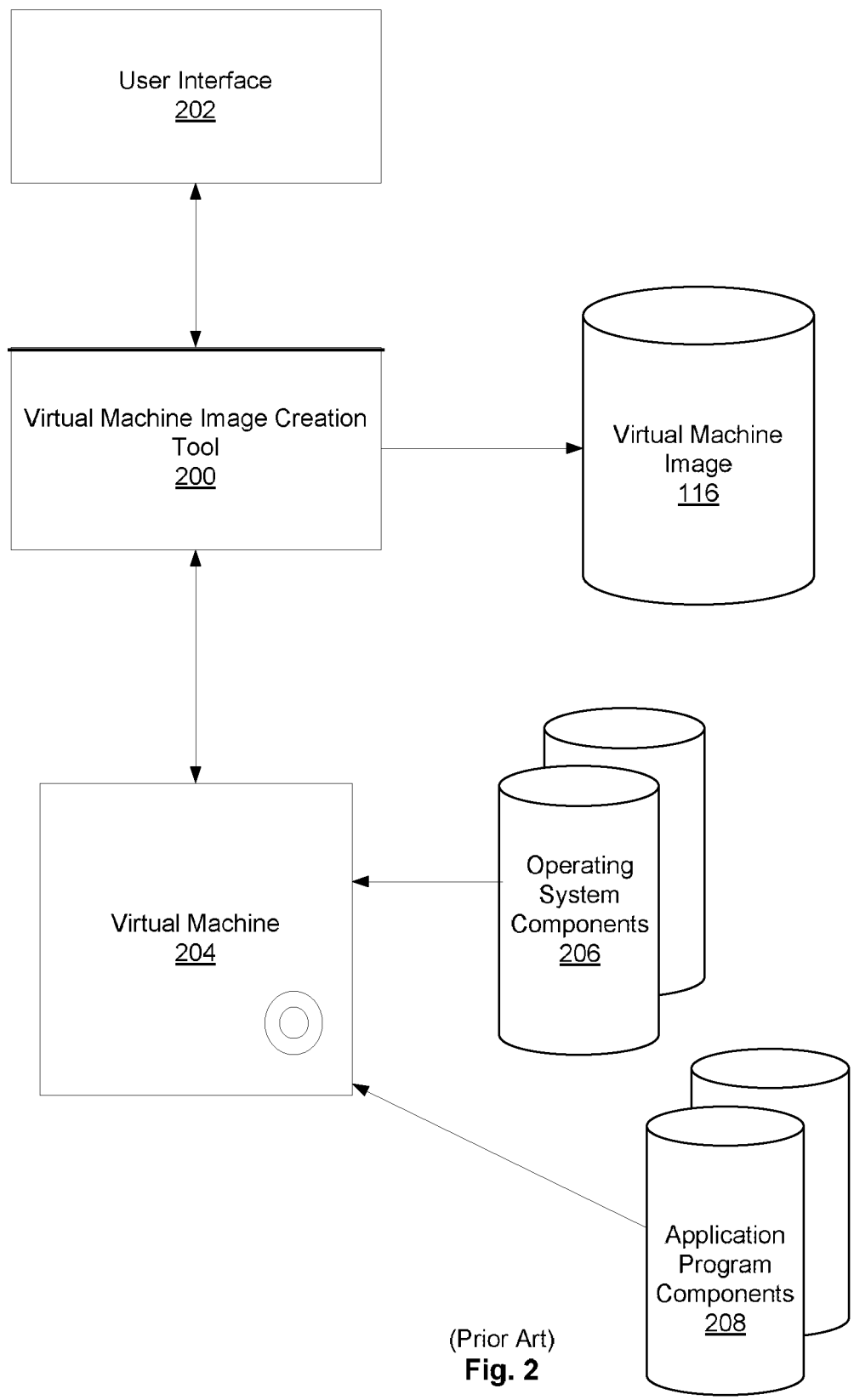
FIG. 2 is a block diagram of components for creating a virtual machine image file of FIG. 1, according to the prior art.

FIG. 2 is a block diagram of components for creating the virtual machine image file 116 of FIG. 1, according to the prior art. An image creation tool 200 provides a user interface 202, by which a user (typically an information technology (IT) technician) interacts with the tool 200. In response to commands and configuration parameters, such as BIOS type, CPU model, amount of memory, initial contents of the memory, number and types of disk drive(s), etc., the image creation tool 200 creates a virtual machine 204.

The image creation tool 200 includes functionality similar to the virtual machine user interface 117 (FIG. 1). Upon instruction from the technician, the image creation tool 200 causes the virtual machine 204 to begin executing instructions, and the user interface 202 allows the technician to interact with the virtual machine 204. For example, the technician can instruct the virtual machine 204 to install an operating system, such as from operating system components 206 stored on computer distribution media. The technician interacts with the operating system installation procedure via the user interface 202, as though the technician were interacting with a real computer. This installation procedure is similar to the procedures performed by computer vendors and/or end users to provision real computers with information about the hardware, software, user accounts, etc. of the computers. For example, during operating system software installation, the operating system typically performs tests to ascertain what hardware is connected to the computer. In the case of installing an operating system on a virtual machine 204, the virtualization program 110 simulates virtual hardware 114, so the operating system configures itself according to the virtualized hardware available on the virtual machine 204.

In addition, the operating system typically prompts for a name for the computer, user account information (username(s) and password(s)), time zone, etc. As noted, the technician supplies this information via the user interface 202. Setting up the operating systems usually requires the technician to log in to the virtual machine 204 to perform some of the setup. For example, once the operating system is installed, the technician may join the virtual machine 204 to a domain. The technician may also install one or more applications on the virtual machine 204, such as from computer distribution media 208. The technician may also set parameters, such as browser favorites/bookmarks, etc., and perform other customizations. Fully setting up the virtual machine may require restarting the operating system one or more times.

After the virtual machine 204 is fully set up, the image creation tool 200 creates the virtual machine image file 116. The contents of the virtual machine image file 116 may include a "snapshot" of the virtual machine 204 that defines the state of the virtual machine. The image creation tool 200 can often set the virtual machine 204 to any state prior to creating the virtual machine image file 116. For example, the operating system of the virtual machine 204 can be shut down (via the user interface 202) and the state of the virtual machine can be set to "powered down." Each time the virtual machine image file 116 is used to instantiate a virtual machine, the virtual machine starts up in the last state stored in the virtual machine image file 116.

An exemplary virtual machine image creation tool is available from VMware, Inc., Palo Alto, Calif. Conventional image creation tools 200 are difficult to use, due to the amount of detail, and the complexity of the details, a technician must provide to the tool. Furthermore, the virtual machine image files 116 created by such prior-art tools are user-specific. That is, a given virtual machine image file 116 describes a virtual machine that has been provisioned with a certain user account(s) and application(s). Such a virtual machine image file 116 is generally not useful to another user. Thus, a different virtual machine image file 116 must be produced for each user. Consequently, creating these user-specific virtual machine image files 116 for all the users who require them can consume a considerable amount of time and IT resources (both human and computer resources).

Creating a Generic Virtual Machine

Figure 3:
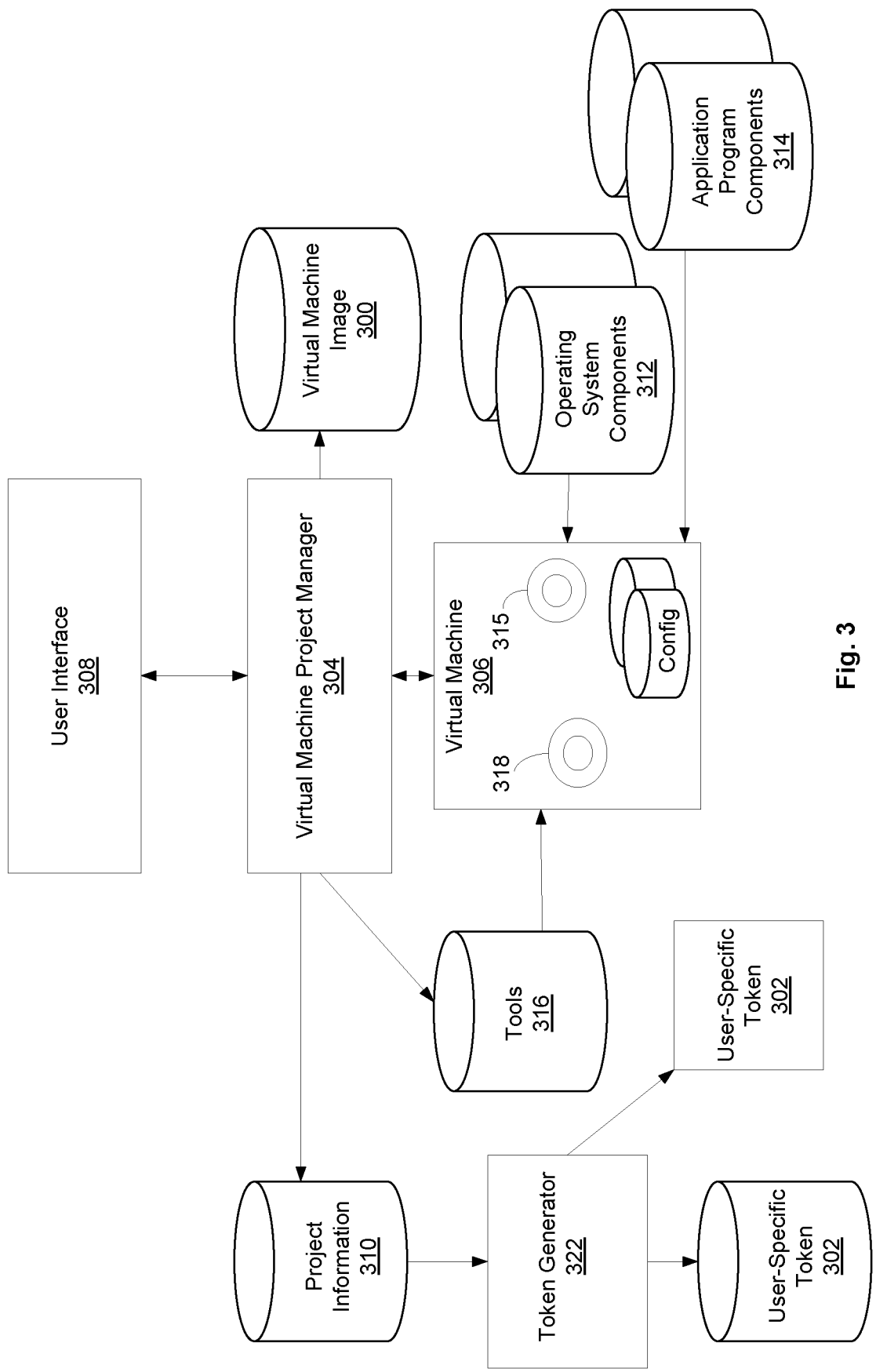
FIG. 3 is a block diagram of components for creating a virtual machine image file, in accordance with one embodiment of the present invention.

As noted, prior-art systems and methods for creating virtual machine image files pose problems, because these image files are user-specific, and creating user-specific image files is time consuming. FIG. 3 is a block diagram of components for creating a "generic," i.e., not user-specific, virtual machine image file 300, in accordance with one embodiment of the present invention. Copies of this generic virtual machine image file 300 can be distributed to one or more users, each of whom can then use an automated procedure (described below) to generate a user-specific virtual machine image file (and, thus, a user-specific virtual machine) on his/her remote computer. The generic virtual machine image file 300 can be distributed to the users on computer-readable media, such as a DVD disks. Optionally or alternatively, the generic virtual machine image file 300 is stored on a server and downloaded (such as via the Internet) by the users. Each user also receives or downloads a token 302, which contains a small amount of user-specific information that is used by the automated procedure to provision the generic virtual machine image file 300 for the particular user.

Figure 4:
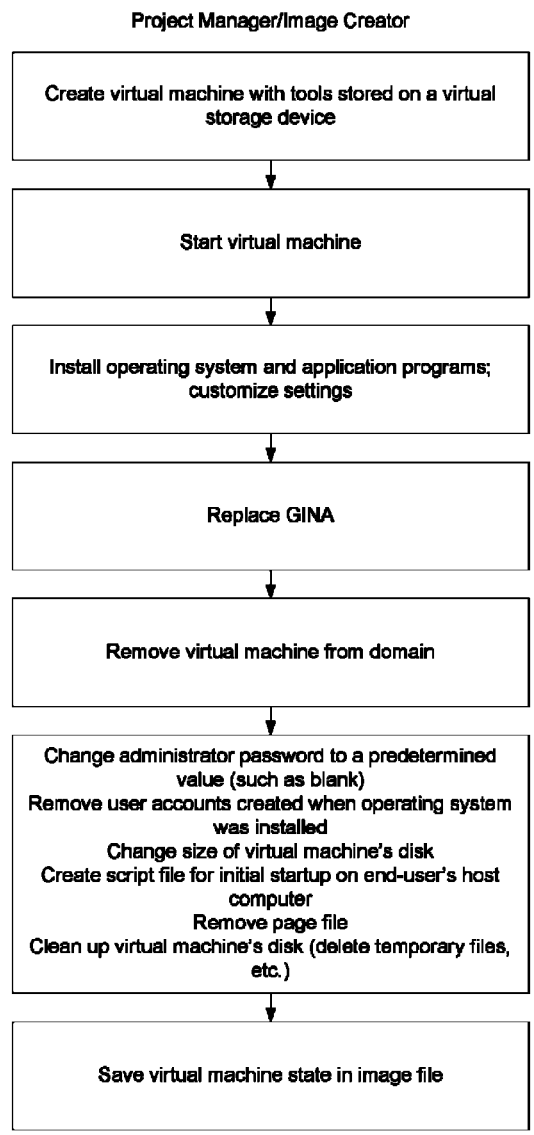
FIG. 4 contains a flowchart of operations related to creating the virtual machine image file of FIG. 3, in accordance with one embodiment of the present invention.

An IT technician or system administrator uses a virtual machine project manager 304 to create the generic virtual machine image file 300. Operations performed to create the generic virtual machine image file 300 are summarized in a flowchart of FIG. 4 and are described in detail below.

First, the virtual machine project manager 304 is used to create a virtual machine 306 and install an appropriate operating system, application programs and data and perform other customizations, as described above. The operating system, application programs, etc. are selected to be suitable for a number of users. Eventually, the virtual machine project manager 304 "de-configures" the virtual machine. This de-configuration includes removing user accounts that were created while the operating system was being installed on the virtual machine 306. The operating system is then "resealed." Thus, the first time the virtual machine is started on the end-user's host computer, the operating system completes its configuration, including setting up a user account specific to the user and performing additional operations described below. Consequently, the generic virtual machine image 300 does not include user-specific information, such as end-user account information. Instead, the generic virtual machine image 300 contains software and/or data that is suitable for a number of users.

Figure 5A:
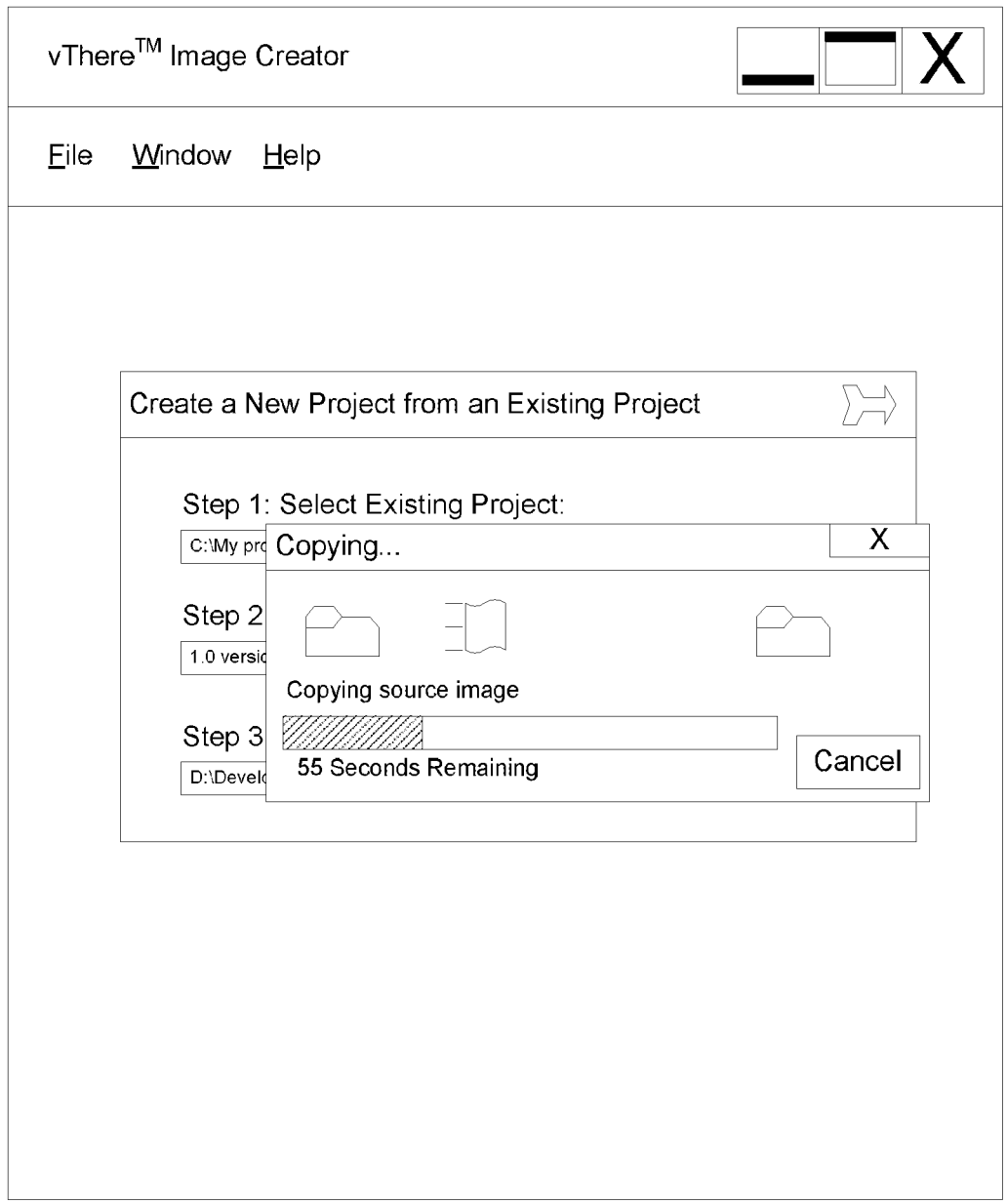

As shown in FIGS. 5A-B, the virtual machine project manager 304 provides a user interface 308 that enables the technician to create and manage descriptions of different, but related, virtual machines. Each of these descriptions is referred to as a "project." The descriptions of these projects are stored in a project data file 310. The projects are related to each other in a hierarchical (tree) fashion, such that child nodes of the tree inherit attributes from their respective parent nodes.

For example, the technician can create one virtual machine with a first set of applications installed on the virtual machine and save a description of this virtual machine as a first project. The technician can then use the first project to create another virtual machine identical to the first virtual machine, without creating the second virtual machine from the beginning. Starting with this second virtual machine, the technician can add or remove applications or perform other customizations and save a description of the second virtual machine as another project in less time than it would take to create the second virtual machine from the beginning.

Thus, the technician can create a base virtual machine (that may or may not be suitable for any group of users) and then use this base virtual machine to create other virtual machines that are suitable for different groups of users. Alternatively, the technician can start with a project that describes a virtual machine suitable for a first group of users (such as doctors) and create a second project that describes a similar, but suitably different, virtual machine that is suitable for a different group of users (such as nurses).

Information, such as memory size or disk drive size, appearing in the fields of FIGS. 5A-B is merely exemplary of the type of data that can be entered into the virtual machine project manager 304. The values shown in FIGS. 5A-B are not meant to provide guidance in selecting values for any particular project.

In one embodiment of the virtual machine project manager 304, for each project, the technician enters a project name to identify the project. The technician also enters, or the project inherits from a parent project, additional information, of the general type listed in Table 1 and as described below.

TABLE 1

Typical Information for Generic Virtual machine

Pattern for naming each end-user's virtual machine
Username and password for an account that can be used to add the end-user's virtual machine to a domain
Domain end-user's virtual machine joins
Password for an administrator account on the end-user's virtual machine
Operating system license key
Initial screen resolution, color depth, etc. of virtual machine
Size of virtual machine memory
Size of virtual machine disk The pattern for naming the end-user's virtual machine referred to in Table 1 can include a concatenation of fixed character strings and variables that are evaluated when the virtual machine is created on the end-user's host computer. For example, the pattern "XY-% USERNAME % RANDNUM4" can indicate that the characters "XY-", the end-user's username and a four-digit random number are concatenated together to form the end-user's virtual machine name.

In a further embodiment of the present invention, the size of virtual machine memory referred to in Table 1 specifies a value that may be adjusted (increased or decreased) each time the virtual machine starts. This is referred to as "dynamic memory allocation," and is described in detail below.

The password for the administrator account is the password that can be used to log on to an administrator's account on the virtual machine, once the virtual machine is operational on an end-user's host computer. This administrator password can, but need not, be the same as the administrator password used while the operating system, etc. software is installed on the virtual machine 306.

After the technician enters the information described in Table 1, the virtual machine project manager 304 creates the virtual machine 306. The technician interacts with the virtual machine 306 via the user interface 308 and installs an operating system and, optionally, applications on the virtual machine using software installation kits 312 and 314. The technician can log in to the virtual machine 306 using an administrator account and password that was established when the operating system software was installed. However in a later operation, this administrator account will be removed, as described below. Computer media that contain the software installation kits 312 and 314 appear as a virtual CD 315 or other storage device within the virtual machine 306. The technician can join the virtual machine 306 to a domain (not shown), if necessary to complete setting up the virtual machine 306.

Information that is needed by programs that execute on the virtual machine 306 during the installation of the operating system, applications, etc. is stored in a directory of tools 316 on the real computer on which the virtual machine project manager 304 is executing. In addition, the virtual machine 306 is configured to include a virtual CD 318 or other storage device linked to the directory of tools 316. Consequently, software executing in the virtual machine 306 can read information (on the virtual CD 318) passed to it by the virtual machine project manager 304. Executable programs (described below) are also passed to the virtual machine 306 through the virtual CD 318 for execution within the virtual machine 306.

For example, the virtual machine project manager 304 includes a tool on the virtual CD 318 to replace, customize or modify selected portions of the operating system or applications installed on the generic virtual machine. An operating system typically includes a graphical identification and authentication (GINA) or other similar component to implement an authentication policy of an interactive logon model. For example, the GINA ascertains if a user is authorized to log on to a computer. The GINA is typically invoked as a result of a user performing a secure attention sequence (SAS), such as simultaneously pressing the Ctrl, Alt and Del keys on a keyboard. Other SASs, such as an interrupt from a fingerprint scanner, can be used.

In one embodiment, a tool on the virtual CD 318 replaces the operating system GINA with a replacement GINA. The replacement GINA checks user-entered credentials, such as a username and password. In addition, the GINA normally establishes a VPN connection between the virtual machine and an enterprise network and joins the virtual machine to a domain. However, while configuring the virtual machine 306, it is sometimes helpful or necessary to isolate the virtual machine 306 from the enterprise network or the domain. For example, during portions of the operating system installation, the administrator's password may be blank. However, a domain policy may prohibit a computer with a blank administrator's password from being an active member of the domain. Consequently, during these portions of the operating system installation, the virtual machine 306 cannot be connected to the domain.

To accommodate this need, the GINA enables a user (such as the technician) to select an option, which causes the GINA to avoid establishing a VPN connection with the enterprise network. This mode of operation is referred to as "off-line" mode. In contrast, the default situation, i.e., not selecting this option and allowing the GINA to establish the VPN connection, is referred to as "on-line" mode. This option can be selected by any suitable form of user interface. For example, the GINA dialog box that prompts for a username and password can include a check box to select off-line mode. Alternatively, a predetermined character, such as a backslash ("\"), included in the username or another field can invoke the off-line mode option.

The GINA accepts "pluggable" VPN clients. In this fashion the virtual machine image can be tailored to work with any of a wide variety of enterprise networks. The GINA for a particular project is thus equipped with a VPN client appropriate to the enterprise network involved.

Once the operating system and applications are installed on the virtual machine 306 and the technician has made other changes to make the virtual machine 306 generically suitable for a group of end-users, an image preparation tool is executed within the virtual machine 306 to de-configure portions of the operating system. The image preparation tool accesses information that describes the project and performs operations of the general type listed in Table 2.

TABLE 2

Typical Operations in Generic Virtual machine Image Preparation

Remove any user accounts that were created
Remove virtual machine from domain
Set administrator account password to a predetermined value, such as blank
Resize operating system paging file
Clean up virtual machine disk (delete temporary files and other unnecessary files)
Install SYSPREP program
Create WINBOM.INI file
Create configuration file for starting the VM operating system in factory mode The administrator account password is set to a predetermined value (such as blank) to facilitate executing an automatic provisioning process on the virtual machine, when the end-user firsts starts the virtual machine. The provisioning process requires administrator privileges, thus the provisioning process will need the administrator account password to log in. The image preparation tool and the provisioning process are configured with the same predetermined password value. Thus, the image preparation tool sets the administrator account password to the predetermined value, and the provisioning process uses the same password to log in.

To reduce the size of the virtual machine image file, the image preparation tool adjusts the size of the VM operating system's page file, it deletes temporary and other unnecessary files and it reduces the size of the VM disk. The image preparation tool sets the page file size to zero, such as by changing appropriate entries in the operating system registry and restarting the operating system. When the operating system restarts, it operates without a page file, and the previously used page file can be deleted. The image preparation tool then calculates a size for the page file, based on the size of the (simulated) memory on the virtual machine. The next time the operating system starts, a page file of this size will be created.

To reduce the size of the VM disk, the image preparation tool removes unallocated portions of the VM disk so these portions will not be included in the VM image. In one embodiment, the image preparation tool reduces the size of the VM disk by writing a predetermined data pattern, such as zeros, into the unallocated portions of the VM disk. The contents of the unallocated portions of the VM disk were previously unspecified, thus writing the predetermined pattern enables the image preparation tool to distinguish allocated from unallocated portions of the VM disk. The image preparation tool then deletes the portions of the VM disk that contain the predetermined data pattern. Consequently, when the VM image file is produced, only the allocated portions of the VM disk are included in the VM image.

Software providers typically distribute operating systems in one form to end users and in another form to value-added computer resellers (vendors). An operating system for an end user is typically configured such that the first time the operating system is started, the operating system prompts the user for user-specific information, such as a computer name, username, password and time zone. The operating system typically automatically configures itself for hardware (such as disk drives, computer network interfaces, etc) that is present on the computer. This process is commonly referred to as "hardware discovery." In addition, the operating system typically configures itself (such as configuring the size of a paging file) according to the amount of memory on the computer. For example, in the Windows operating system from Microsoft, Inc., this process is referred to as "mini setup." The operating system uses user responses to these prompts and automatically determined information to fully configure itself. As discussed below in connection with an embodiment of the present invention, the mini setup process can also be driven by an answer file, rather than accepting user responses and using hardware discovery.

On the other hand, a vendor typically needs to start an operating system in order to install software that is to be bundled with a computer, without executing the mini setup, because the vendor does not wish to configure the operating system, i.e., specify the computer name, etc. Software tools, such as SYSPREP from Microsoft, Inc., enable a vendor to start an operating system in "factory mode," i.e., without executing mini setup. After the vendor installs the bundled software, the vendor uses SYSPREP to "reseal" the operating system. Resealing configures the operating system to execute the mini setup the next time the operating system starts, presumably when an end-user first starts the computer.

The virtual machine image preparation tool installs SYSPREP (or equivalent) on the virtual machine and executes SYSPREP to configure the operating system to start in factory mode the next time the operating system starts, i.e., the first time the operating system starts on the end-user's virtual machine. The virtual machine image preparation tool also creates a WINBOM.INI (or equivalent) file, which will be used to control operations during the factory mode startup of the operating system. The WINBOM.INI includes instructions to start the provisioning program, such as by invoking a batch file.

Computer Distribution Medium Generation

Figure 6:
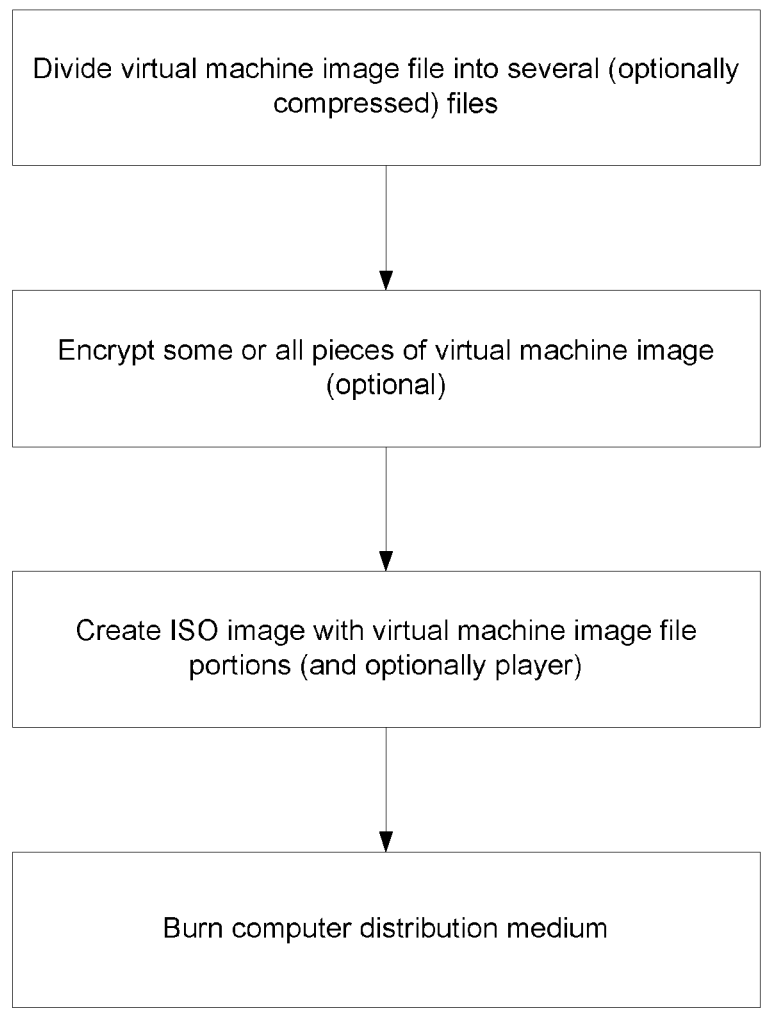
FIG. 6 is a flowchart of operations related to creating computer-readable media that contain the virtual machine image file of FIG. 3, in accordance with one embodiment of the present invention.
Figure 7:
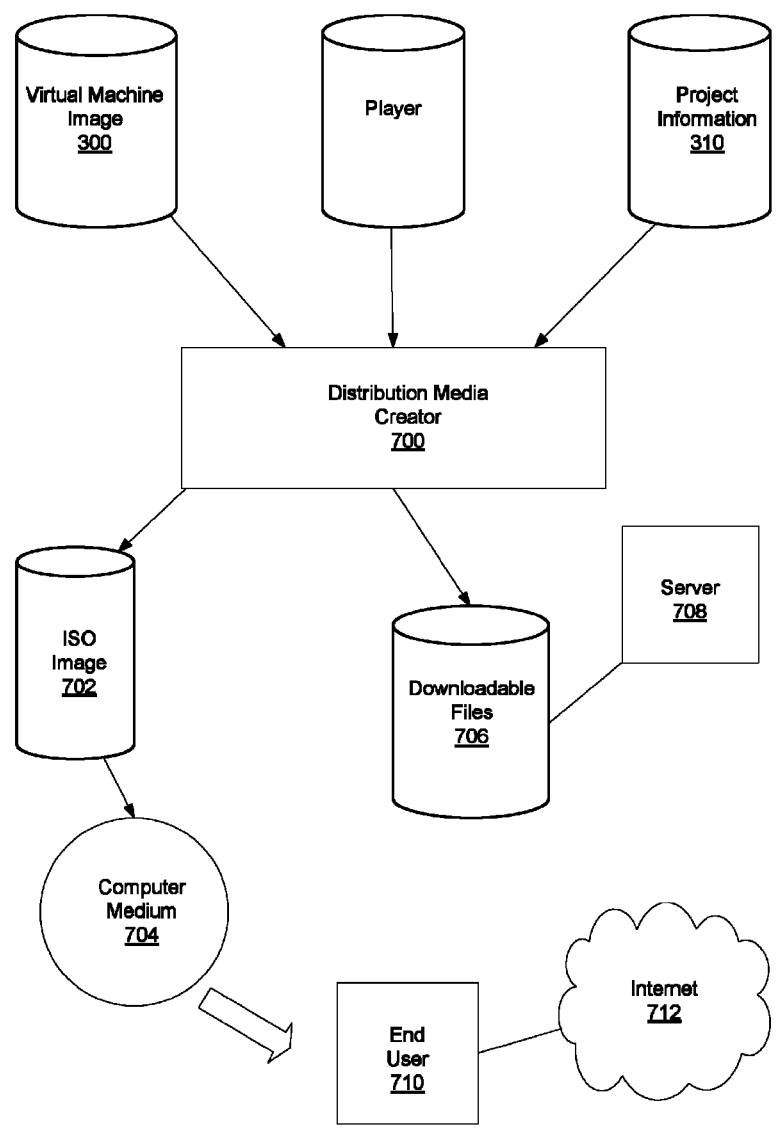
FIG. 7 is a block diagram of components for creating the computer-readable media of FIG. 6, in accordance with one embodiment of the present invention.

After the virtual machine project manager 304 creates the virtual machine image file 300, a distribution media creator creates computer media, which can be distributed to end users, and/or stores downloadable files on a server, so end users can download the virtual machine image file, such as via the Internet. Operations performed by the distribution media creator are summarized in a flowchart in FIG. 6 and described in detail below, with reference to a block diagram (in FIG. 7) of components involved in these operations.

The distribution media creator 700 reads the virtual machine image file 300 and the project information 310 to create an ISO image 702 of a computer medium 704 (such as a DVD disk), which can be distributed to end-users. Alternatively or additionally, the distribution media creator 700 stores one or more files 706 on a server 708 to facilitate downloading the virtual machine image file by a user 710, such as via the Internet 712. Typical contents of the distribution medium 704 (or the downloadable files 706) are summarized in Table 3.

TABLE 3

Typical Distribution Medium Contents

Auto-run program
Virtual machine image file (as a set of files)
Player (virtualization program and related components) (optional)
Project information (encrypted)
Credentials for an administrative account, for use during initial customization of the VM to a particular user, in joining the virtual machine to a domain
Distribution medium package contents The distribution medium creator 700 divides the virtual machine image file 300 into a set of smaller files, each containing a portion of the virtual machine image file 300. Each of these smaller files is optionally compressed and/or encrypted before storing it on the ISO image 702 or server file 706. The virtual machine image file can be large. Thus, storing the virtual machine image file 300 as a set of smaller files on the server 708 enables a download to restart at a point of failure, rather than restarting from the beginning of the virtual machine image file. Optionally, in a related embodiment of the present invention, the smaller files may be stored on a plurality of servers for efficient distribution to users and may also be distributed using peer-to-peer methods.

As noted, a virtualization program is required to create a virtual machine from a virtual machine image file. A "player" is such a virtualization program that includes other capabilities, as described below. The player can be previously installed on an end-user's computer or the player can be distributed with the virtual machine image file on the computer medium 704.

The computer medium 704 includes encrypted project information, such as the end-user's virtual machine naming pattern, virtual machine screen resolution and color depth and credentials of the account to be used to join a domain. The computer medium 704 also includes an auto-run program that automatically executes when a user inserts the computer medium 704 into his/her computer. This auto-run program can install the player (if not already installed) and performs other operations, as described below.

The distribution medium package contents may include hash values calculated from the files on the distribution medium, so when the distribution medium is later read, its contents can be tested for corruption.

Token Generation

The computer medium 704 and the virtual machine image 300 stored on the computer medium 704 is generic. That is, no user-specific information is stored on the computer medium 704. In addition, the virtual machine 306 that would be created from the virtual machine image 300 does not have a user account, computer name or other provisioning that would make the virtual machine specific to a particular user. This provisioning will be performed the first time each end user starts the virtual machine on his/her respective host computer. To facilitate this provisioning, a token is created for each user who may use the computer medium 704. Typical components used to create the tokens are shown in FIG. 3, and typical contents of a token are listed in Table 4. Some or all of the contents of a token may be encrypted and can be decrypted using a suitably provided decryption key.

TABLE 4

Typical Token Contents

Customer identification (for Internet downloading) (optional)
Project name
Token expiration time and date
End-user username
Key for decrypting virtual machine image
Credentials for an administrative account that can join the virtual machine to a domain (optional)

A token generator 322 reads the project information 322 and accepts user inputs via a user interface 324 to produce the token 302. In one embodiment of the token generator 322, the token is a file that contains the information listed in Table 4 formatted as XML text.

The token generator 322 can be included in an IT organizations automated procedure for establishing a user account or setting up a user computer.

The token can be provided to the end user via any appropriate mechanism. For example, the token can be sent as an e-mail attachment to the end user. Alternatively, the token can be provided to the end user on a removable computer medium, such as a flash memory that is connectable to a computer port, such as a universal serial bus (USB) port.

As noted, in lieu of distribution of the virtual machine image by a tangible medium such as a DVD, in another embodiment of the invention, the end user can download the virtual machine image from a server 708. In a further embodiment, the server 708 may be employed to store virtual machine images for several different organizations. The customer identification in the token 302 can be used to distinguish among these organizations. For example, a URL can be defined for the location of each organizations' virtual machine image file. An end user can browse to the appropriate URL to begin a download process that includes the virtual machine image associated with the end-user's organization. For example, browsing to URL "XYZ.VThere.net" would begin downloading the virtual machine image file (and associated components) for the XYZ organization. The URL can be provided to end users via any appropriate mechanism, such as including a hyperlink to the URL in an e-mail message sent to the end users.

Similarly, in lieu of distributing tokens by e-mail or a tangible medium, the token may be provided as a part of a URL itself. Base-64 encoded text that would otherwise be included in the XML token 302 can be included in the URL provided to the end user, such as in a parameter postpended to the URL.

Automatically Provisioning End-User Virtual Machine

Creating and provisioning an end-user's virtual machine requires little end-user interaction. Components related to creating and provisioning the virtual machine on the end-user's host computer are shown in a block diagram in FIG. 8, and operations related to creating the virtual machine are shown in a flowchart of FIG. 9. As noted, the computer medium 704 includes an auto-run program, which installs 904 the player 800 on the end-user's host computer 802, if the player is not already installed. The player installation procedure creates an association between tokens and the player 800, such that if the user invokes a token, the player automatically processes the token. For example, under the Windows operating system, the player registers the file type of the token 302 (for example, an extension in the form of ".vttok", to avoid confusion with other file names in a Windows XP operating system environment) and specifies the player 800 as the application program to be executed when a file of this type is invoked.

Thus, when the end-user invokes 906 the token 302, such as by double-clicking on the token 302 attached to an e-mail message 804 (or by clicking on a hyperlink to the token embedded in the message 804), the player 800 begins processing the token. The player 800 uses an appropriate decryption key to decrypt encrypted portions of the token 302. The player 800 checks the expiration time and date of the token 302. If the token has not yet expired, the player 800 uses the key included in the token 302 to decrypt (in a process 908) and copy the virtual machine image file from the computer distribution medium 704 (or server) to the host computer 802. The player 800 also copies other information from the token 302 to the host computer 802.

Figure 10A:
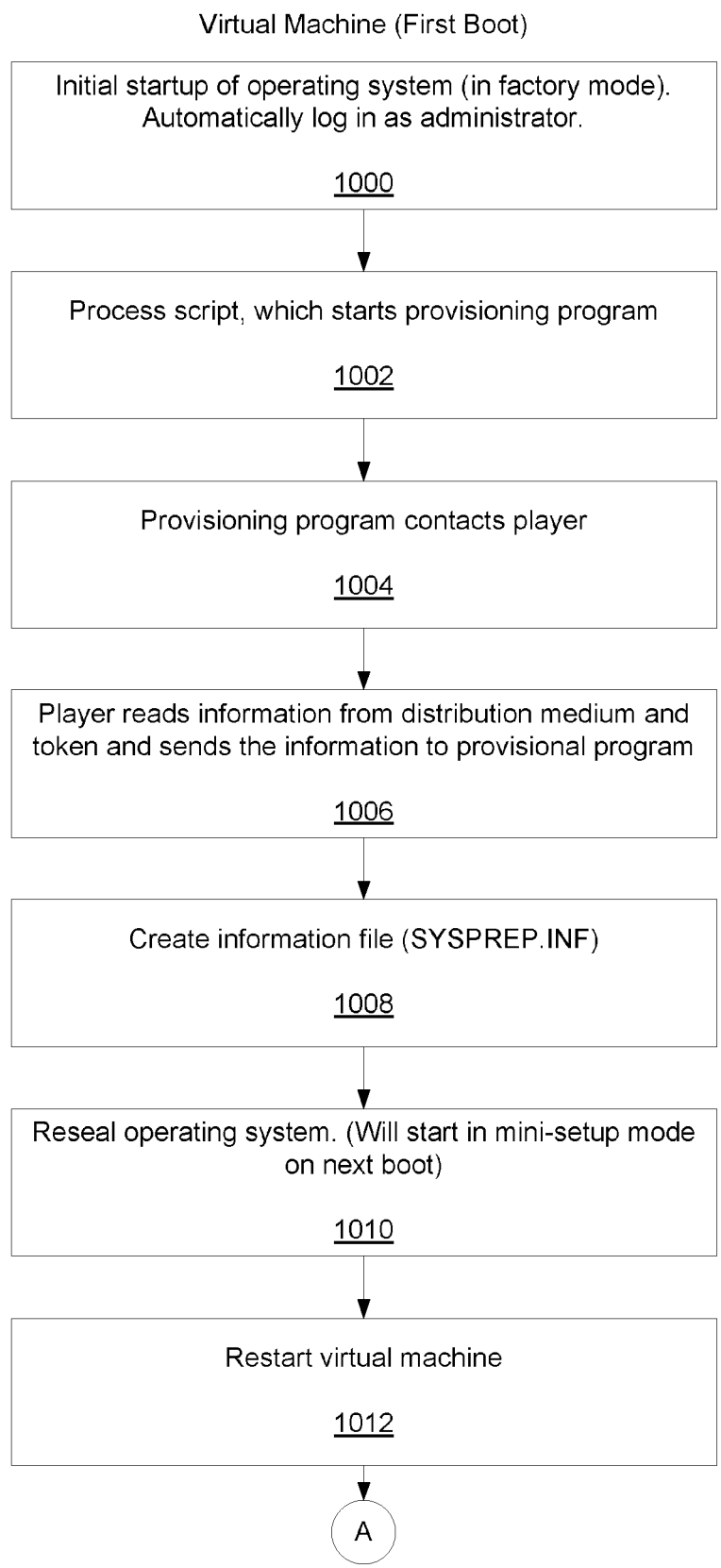
FIGS. 10A-B contain a flowchart of operations performed by the virtual machine of FIG. 8 the first time the virtual machine starts, in accordance with one embodiment of the present invention.
Figure 10B:
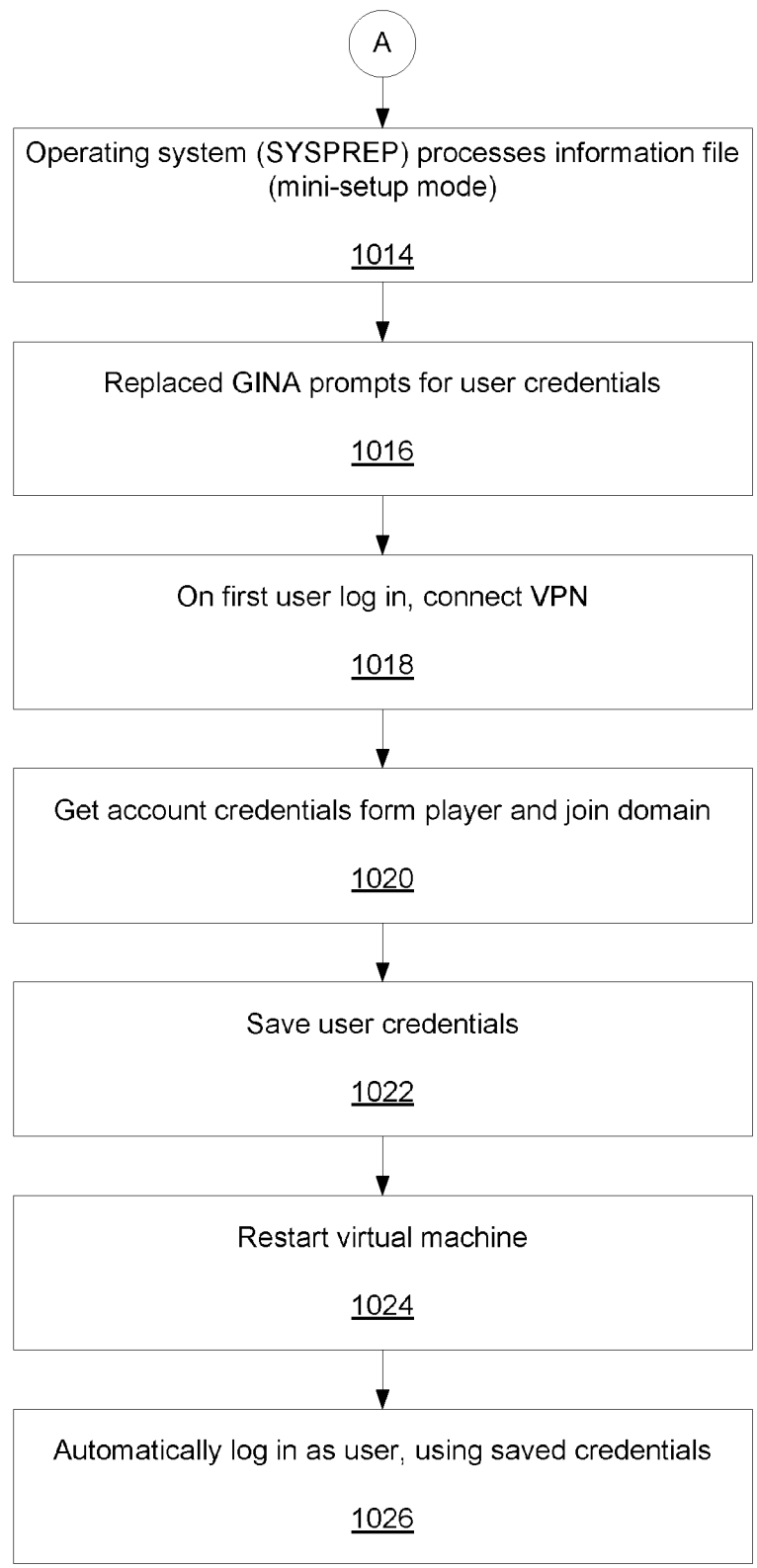

The player 800 uses the decrypted virtual machine image file 806 to create and start (in process 910) a virtual machine 808. Operations related to the first start of the virtual machine 808 are shown in a flowchart in FIGS. 10A-B. In process 1000, the virtual machine 808 begins executing the operating system, which has been configured to start (the first time) in factory mode, causing automatic login with administrative privileges, and to execute the provisioning program.

Before creating the virtual machine 808, the player 800 opens a listening port. A provisioning program 812 opens (in process 1004) a connection 813 to the player's listening port, so the provisioning program 812 and the player 800 can communicate with each other over this connection 813. The player 800 reads (in process 1006) the project information from the distribution medium 704 and from the token 302 and sends this information to the provisioning program 812. This information includes the computer naming pattern, time zone, screen resolution and color depth and key for decrypting the virtual machine image. (The player can ascertain the time zone from the host operating system on the host computer.) The provisioning program 812 uses this information to create (in process 1008) a SYSPREP.INF file. For example, the provisioning program 812 generates a name string for the virtual machine 808 according to the naming pattern specified by the technician to the virtual machine project manager 304 (FIG. 3). The provisioning program 812 sets a parameter in the SYSPREP.INF file to prevent the mini setup process from prompting for user input and performing hardware discovery. The provisioning program then reseals (in process 1010) the operating system. Consequently, the next time the operating system starts, the operating system will perform the mini setup procedure.

The provisioning program then restarts (in process 1012) the virtual machine 808, and the operating system starts (in process 1014) the mini setup procedure. The mini setup procedure reads the SYSPREP.INF file created earlier. Consequently, the mini setup procedure does not prompt the user for information or perform hardware discovery. The user may see the mini setup procedure progress, although the user sees the input fields already filled in with information from the project information and the token 302.

Once the mini setup procedure completes, the GINA 811 prompts (in process 1016) the user for credentials, such as a username and a password. Optionally, if needed to establish a VPN connection between the virtual machine 808 and the user's enterprise network, the GINA 811 prompts for additional credentials, such as a second username, a second password and a pseudo-random passcode. (An exemplary system for providing pseudo-random passcodes is available from RSA Security, Inc., Bedford, Mass. under the tradename RSA SecurID authentication.)

The GINA 811 uses the user-entered credentials to establish (in process 1018) a VPN connection 814 to the user's enterprise network 816. If the VPN connection is refused due to invalid user credentials, the GINA 811 re-prompts the user and retries to establish the VPN connection using subsequently-entered end-user credentials, optionally up to a predetermined number of times.

Figure 8:
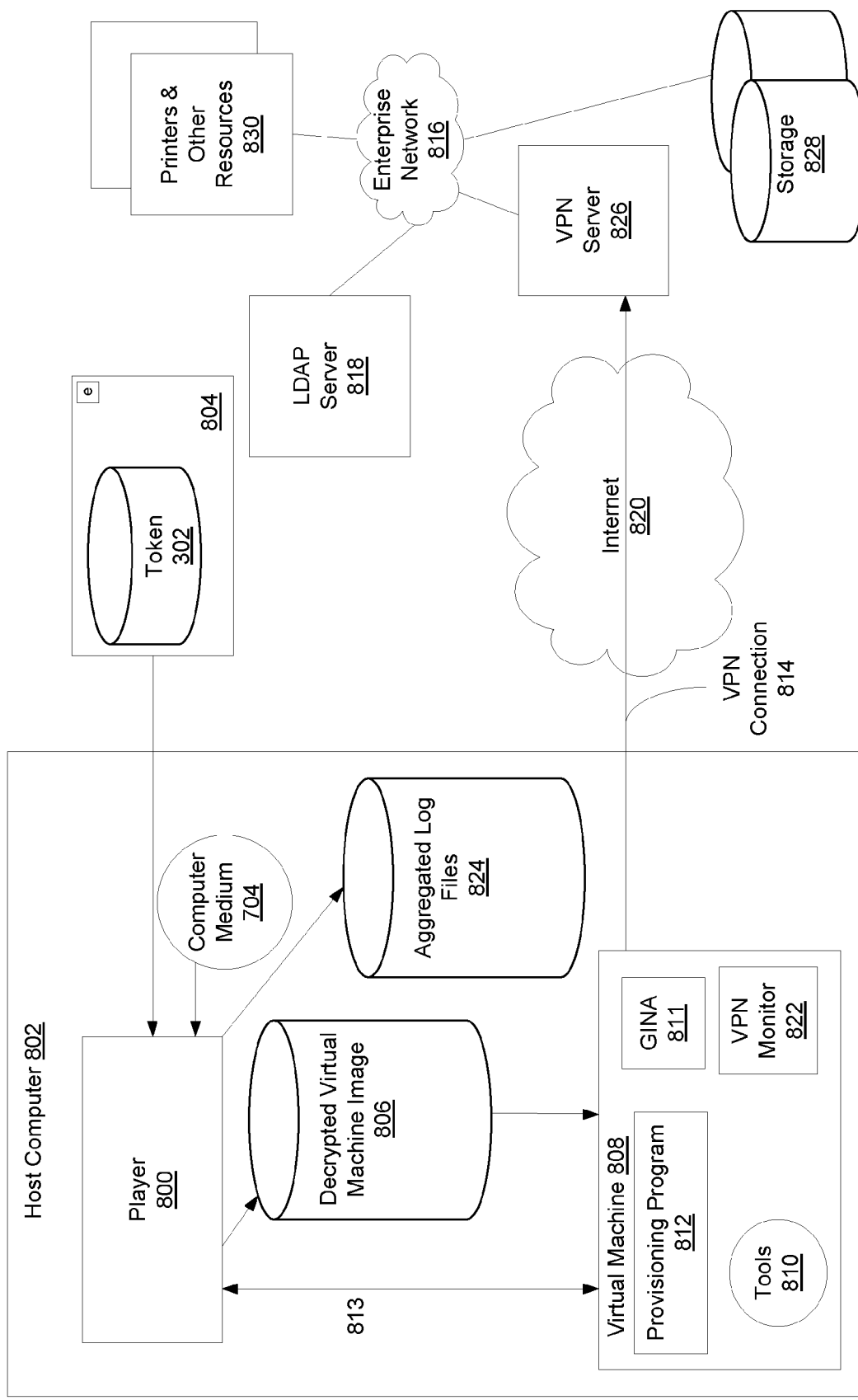
FIG. 8 is a block diagram of components for creating a user-specific virtual machine from the computer-readable media of FIG. 6, in accordance with one embodiment of the present invention.
Figure 9:
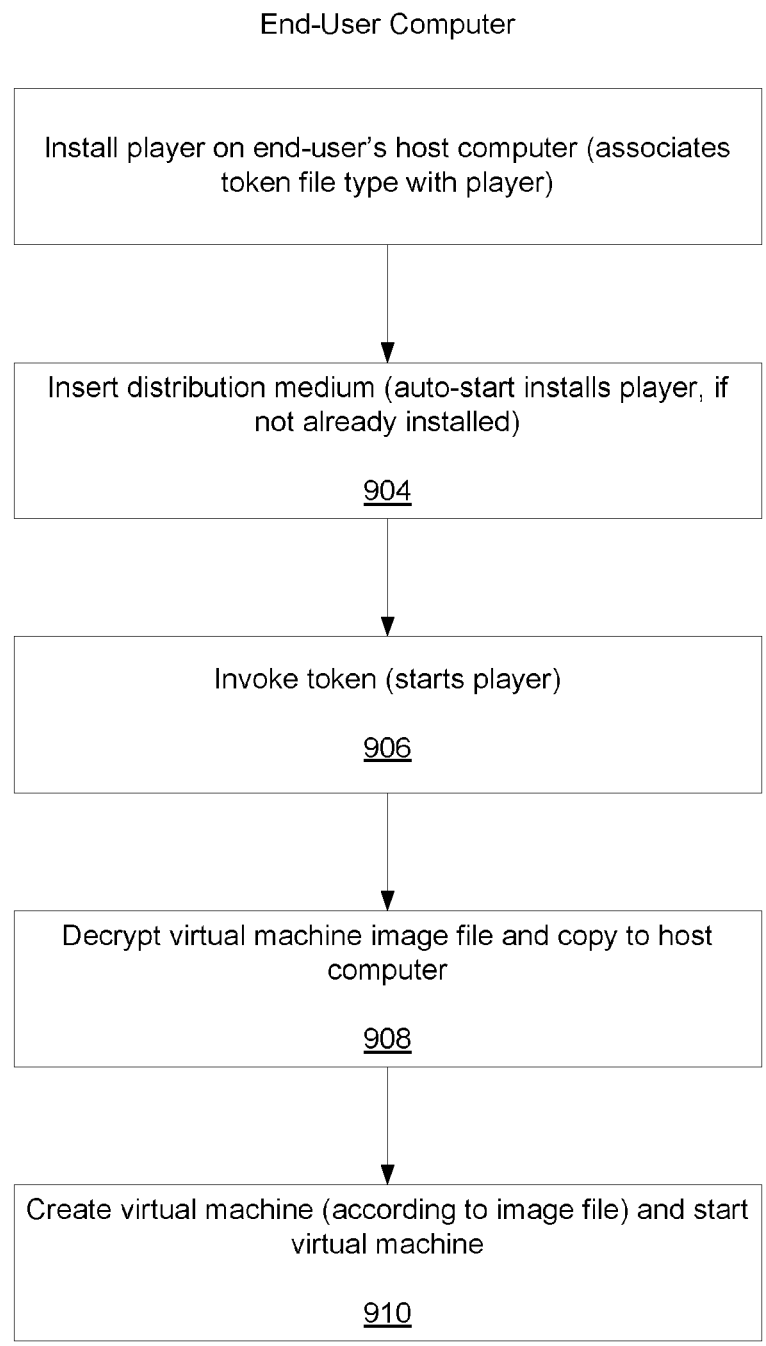
FIG. 9 is a flowchart of operations related to creating the user-specific virtual machine from the computer-readable media of FIG. 6, in accordance with one embodiment of the present invention.

Once the virtual machine 808 is connected via the VPN connection to the enterprise network 816, the GINA 811 recognizes this as the first time the user has logged on. Consequently, the GINA 811 communicates with the player 800 to obtain (in process 1020) the credentials of an account that can be used to join the virtual machine 808 to a domain on the enterprise network. (Typically, the end-user does not have sufficient privileges to join a computer to the domain.) As noted, these credentials are stored on the computer medium 704. The virtual machine 808 then executes a program that joins the virtual machine 808 to a domain, using the credentials stored on the computer distribution medium 704 and passed to the program by the player 800 via the connection 813. Until the virtual machine 808 joins a domain, the GINA 811 typically can not ascertain the validity of the user-entered credentials. However, once the virtual machine 808 joins the domain, the GINA 811 can validate the user-entered credentials, such as by using an identity store, such as a light-weight directory access protocol (LDAP) server 818 (FIG. 8). An exemplary identity store is available from Microsoft, Inc. under the tradename Active Directory system; however, other suitable identity stores may be employed.

The GINA 811 saves (in process 1022) the user-entered credentials and restarts (in process 1024) the virtual machine 808. When the operating system restarts, the GINA 811 automatically re-establishes the VPN connection and logs the end-user in (in process 1026), using the saved credentials. If any of the user credentials (such as the pseudo-random passcode) have expired, the GINA 811 re-prompts for these credentials. However, if a fob or other device connected (such as via a USB port) to the host computer 802 can be interrogated to obtains these credentials, the GINA 811 automatically does so. Similarly, if software executing on the host computer 802 can be interrogated for these credentials, the GINA 811 does so.

When the virtual machine is shut down, the current state of the virtual machine is saved in the virtual machine image file 806. Once the user-specific virtual machine image file has been generated by the automated procedure described above, the virtual machine image file 806 is considered to have been provisioned to the user.

Virtual Machine Shutdown

If the end-user shuts down the virtual machine 808, such as by using the operating system's shut-down procedure, the next time the user starts the virtual machine 808, the virtual machine 808 starts as though it had just been powered up. That is, the BIOS startup procedure executes, the operating system starts up and, eventually, the GINA 811 prompts for user credentials.

In the prior art, if a user simply "closes" a virtual machine (such as by clicking on a window "close" icon, typically an "X" in the virtual machine user interface 117 (FIG. 1)), the virtualization program "powers down" the virtual machine. In this case, the next time the user starts the virtual machine, the virtual machine starts as though it had just been powered up, as described above.

Figure 11:
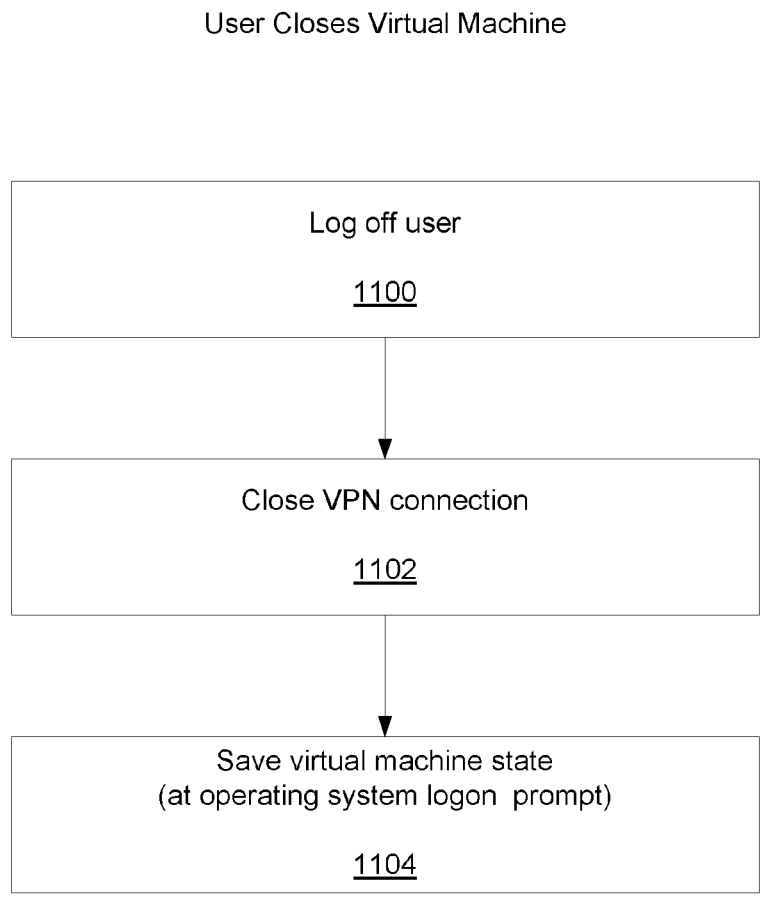
FIG. 11 is a flowchart of operations performed by the virtual machine of FIG. 8 if an end user closes the virtual machine, in accordance with one embodiment of the present invention.

In one embodiment of the player 800 (FIG. 8), the virtualization program is modified to force logout of the user on the virtual machine if the end-user attempts to close the virtual machine 808. In one embodiment, if the user attempts to close the VM, control is passed to the player 800 to effectuate the logout; in another embodiment, control is passed to the GINA to effectuate the logout. For example, a portion of the virtualization program that normally shuts down network operations can be modified ("hooked") to pass control to another program. Operations, according to this modification, are shown in a flowchart in FIG. 11. Rather than virtually powering down the virtual machine 808, the player communicates with the GINA 811, which automatically logs the user off (in process 1100) and disconnects (in process 1102) the VPN connection. When the logout and VPN disconnection are complete, the GINA 811 displays a prompt for user credentials and notifies the player 800. At this point, the player 800 saves the state of the virtual machine 808. The next time the end-user starts the player to create the virtual machine 808, the virtual machine does not need to perform a bootstrap operation and start the operating system. Consequently, the user credential prompt is displayed quickly.

Virtual Machine Startup

Figure 12:
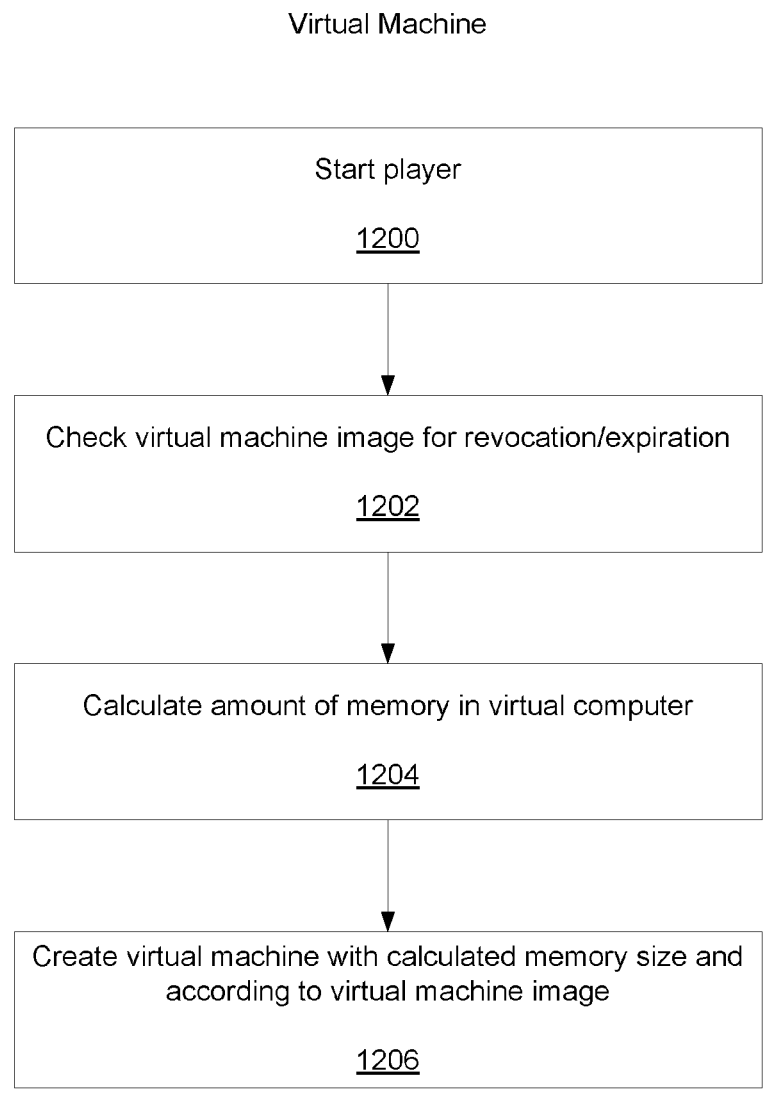
FIG. 12 is a flowchart of operations performed by the virtual machine of FIG. 8 each time the virtual machine starts, in accordance with one embodiment of the present invention.

Each time the player 800 is invoked to start a virtual machine 808, the player 800 can perform a variety of checks and reconfigure itself to account for changes that might have been made to the host computer 802 on which it executes. These operations are summarized in a flowchart in FIG. 12 and described below.

Each time the player 800 is invoked to start (in process 1200) a virtual machine 808, the player 800 optionally verifies (in process 1202) that the virtual machine 808 has not yet expired or has not been revoked. For example, when the technician built the generic virtual machine 306 (FIG. 3) or created the token 302 for this end user, the technician could have specified an expiration date and time for the virtual machine. If so, this expiration information is stored in the project information 310 (if it applies to all end-users of this virtual machine) or in the token (if it applies to only this end-user). If the player 800 ascertains that a virtual machine that it is starting has expired, the player 800 displays an appropriate error message to the end user. Optionally, the player 800 sends an e-mail or other type of electronic message to the IT organization that produced the virtual machine image. This message includes the project identification, end-user identification and can also include information about the virtual machine that expired, such as operating system and application license information. The IT organization can "recycle" the software license keys and use them on other computer or otherwise dispose of them. Optionally, the player 800 also deletes the virtual machine image file 806 from the end-user's host computer 802.

Alternatively or in addition, each time the player 800 is to start a virtual machine, the player 800 may access a server (not shown) associated with the IT organization that created the virtual machine. On this server, the IT organization posts information identifying virtual machines that are revoked or have expired (or, alternatively, virtual machines that have not been revoked or have not yet expired). This information can include the serial number of the virtual machine, end-user information (such as username), project information or any other suitable information that can be used to identify one or, if appropriate, more virtual machines. If the information on the server indicates that the virtual machine has been revoked or has expired, the player 800 performs operations similar to those described above.

Virtual machine expiration and/or revocation enable an IT organization to more easily manage virtual machines. For example, an IT organization can issue virtual machines to employees, contractors, vendors and the like and easily disable those virtual machines, without physically retrieving anything. This is particularly advantageous in the case of employees, contractors, etc. who work remotely and may never be present in the organization's offices. In contrast, if the IT organization issued a laptop or deskside computer, when an employee's employment terminates or a contractor's project ends, the organization must retrieve potentially valuable hardware to prevent unauthorized access to the organization's applications and data.

In addition, each time the player 800 is invoked to start (in process 1200) a virtual machine 808, the player 800 optionally recalculates (in process 1204) the amount of memory the virtual machine 808 is to have. In a typical virtual machine arrangement, the physical memory of the host computer 802 is divided (not necessarily equally) between the virtual machine and the host operating system. As noted, a technician specifies to the virtual machine project manager 304 the amount of (simulated) memory that the virtual machine is to have. However, if insufficient physical memory on the host computer 802 remains for the host operating system, the host operating system and applications that execute under it may perform poorly or may not execute at all.

To calculate the amount of simulated memory on the virtual machine 808, the player begins with the amount of simulated memory that was specified to the virtual machine project manager 304. If allocating this amount of physical memory to the virtual machine 808 leaves an insufficient amount of physical memory for the host operating system, the player 800 reduces the amount of memory allocated to the virtual machine 808. For example, if less than a predetermined amount (such as 256 MB), or an amount calculated based on the software installed on the host computer, of physical memory is left for the host operating system, the amount of memory allocated to the virtual machine is reduced by up to a predetermined amount (such as ⅓ of the amount specified to the virtual machine project manager 304). On the other hand, if more than the predetermined or calculated amount of memory is left for the host operating system, the amount of memory allocated to the virtual machine is increased by up to a predetermined amount (such as ½ of the amount specified to the virtual machine project manager 304).

Each time the virtual machine 808 is started, the GINA 811 can perform additional checks to ensure the virtual machine is authorized, not expired and not revoked. For example, the GINA 811 can communicate via the connection 813 with the player 800 to ensure the player 800 was distributed with the computer medium 704 or is otherwise an approved player. Because several software suppliers provide players, the GINA 811 can ensure it operates only with an approved player. If the GINA 811 detects an unauthorized player 800, the GINA can optionally shut down the virtual machine 808.

As noted, when the user enters credentials, the GINA 811 normally establishes a VPN connection 814 between the virtual machine 808 and the enterprise network 816. However sometimes, it is helpful or necessary to isolate the virtual machine 808 from the enterprise network 816 or the domain. Embodiments of the present invention permit the virtual machine 808 to operate in such an isolated mode. For testing purposes, for example, the GINA 811 enables a technician to select the option (described above in connection with generating the generic virtual machine image) that causes the GINA 811 to avoid establishing a connection with the domain; this mode of operation is referred to as "off-line" mode. In a related embodiment, the user (without invoking administrative privileges) may be permitted to operate the virtual machine in a "local" mode, in which the GINA 811 similarly avoids establishing a connection with the domain.

Virtual Machine Operation

While the virtual machine 808 is operating with the VPN connection 814 to the enterprise network 816, a VM monitor 822 monitors the VPN connection 814. If the VPN connection 814 malfunctions or is dropped (such as a result of an error in an intervening wide-area network 820, such as the Internet), the VPN monitor 822 notifies the GINA 811, which automatically re-establishes the VPN connection 814. Optionally, the GINA 811 displays a message to the user.

Various tools, such as the GINA 811 and the VPN monitor 822, execute in the virtual machine 808 to create and maintain the virtual machine environment in which applications can execute. The GINA 811, or alternatively, another program, causes aggregation of log information from these tools, as well as log information from the virtualization program, and sends this log information to the player 800 via the connection 813 between the virtual machine 808 and the player 800. The player 800 stores the log information in an aggregated log file 824 on the host computer 802, which is accessible even if the virtual machine 808 is not running or if the virtual machine 808 cannot be started. Significantly, an IT technician can use the aggregated log file 824 on the host computer 802 to diagnose problems starting or running the virtual machine 808, even if the virtual machine 808 cannot be started.

To facilitate diagnosing problems in the virtual machine 808, the GINA 811 responds to a predetermined signal, such as the user simultaneously pressing the Ctrl+Alt+Shift+L keys, by sending any cached log file information to the player 800.

Portable Virtual Machines

A virtual machine image file 806 can be stored on a portable memory device, such as a flash memory, that can be connected to a computer port, such as a USB port. Such a virtual machine image file 806 can then be carried by a user and used on various host computers to create the user's virtual machine. For example, if a campus or library were equipped with one or more computers on which copies of the player 800 are installed, an end user could use any available real computer to host his/her virtual machine. Optionally, if an available real computer does not have the player installed, the player could be installed from the portable memory device prior to launching the virtual machine.

Decentralizing Centralized Services

Computer programs that are typically executed by central servers in an organization can be distributed to otherwise idle computers using the described virtual machines. For example, an IT organization can create a virtual machine on each workstation within an enterprise and, optionally, on remote workstations. Then, the IT organization can distribute software that otherwise would be executed by web servers, e-mail servers and the like to these virtual machines. Users' workstations are typically under utilized. Consequently, these computers typically have sufficient resources to execute the virtual machines and the services discussed above.

Printing

Figure 13:
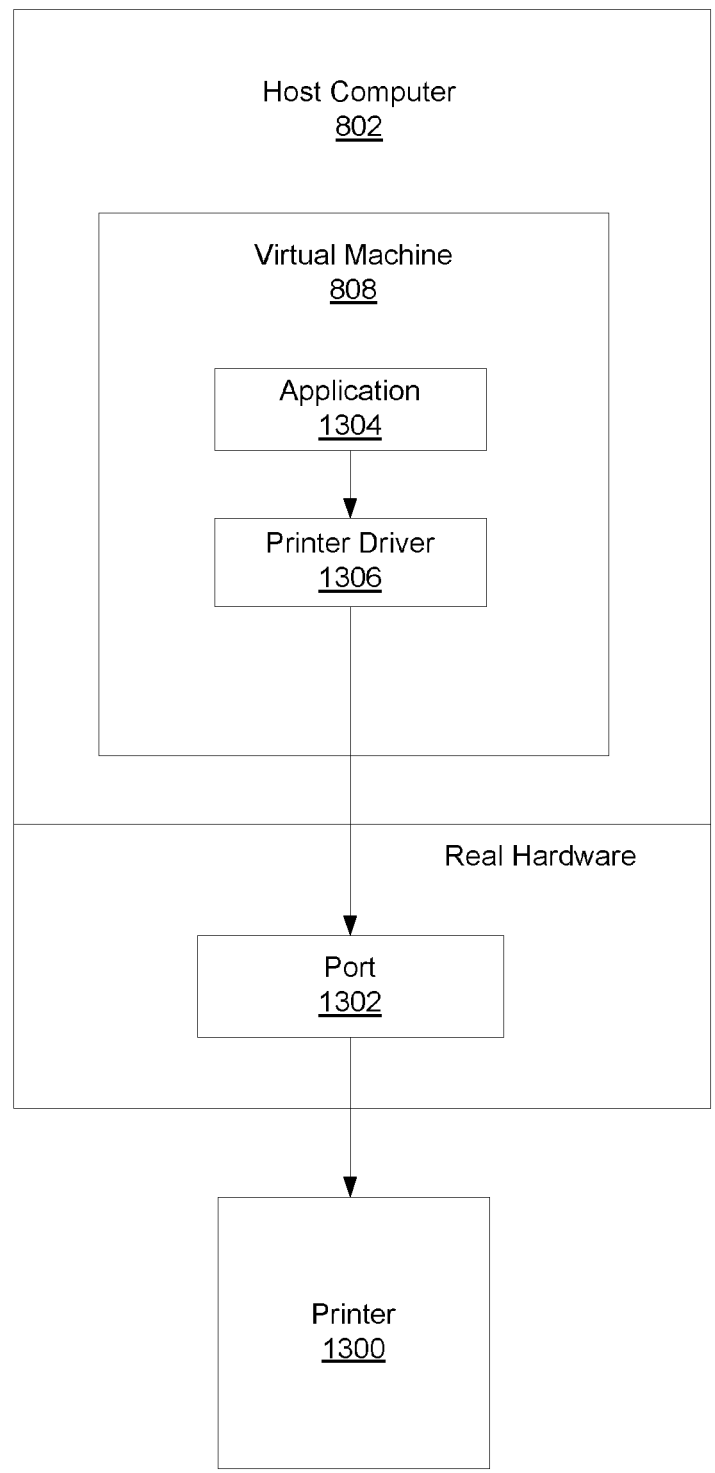
FIG. 13 is a block diagram of a printing system, according to the prior art.

In the prior art, printing from a virtual machine to a printer connected to a host computer poses problems. Embodiments of the present invention provide a range of solutions to these problems. As shown in FIG. 13, according to the prior art, a virtual machine 808 can access a printer 1300 that is directly connected, via a port 1302, to a computer 802 that hosts the virtual machine 808. The port 1302 may be a USB port, a parallel port or a serial port on the host computer 802. Control of the port 1302 is taken away from the host operating system and given to the operating system being executed on the virtual machine 808. Among other disadvantages, under this scheme, application programs (not shown) being executed by the host computer 802 cannot print to the directly-connected printer 1300; only application programs (such as application 1304) being executed by the virtual machine 808 can access the printer 1300. Furthermore, the virtual machine 808 must be configured with an appropriate device driver 1306 for the printer 1300; however, the printer type may not be known at the time the virtual machine 808 is created or provisioned for a given user, thus the type of device driver may not be known when the virtual machine 808 is created or provisioned. Under these circumstances, the appropriate device driver 1306 must be installed later; however, device driver installation is typically too complex for an end-user to perform. Furthermore, the end-user typically does not have required administrator privileges on the virtual machine 808 to install a device driver.

In any case, only directly-connected printers are accessible by the virtual machine 808. The virtual machine 808 cannot access printers that are connected to the host computer 802 via a network connection (other than printers that are part of a domain that the virtual machine joins).

Figure 14:
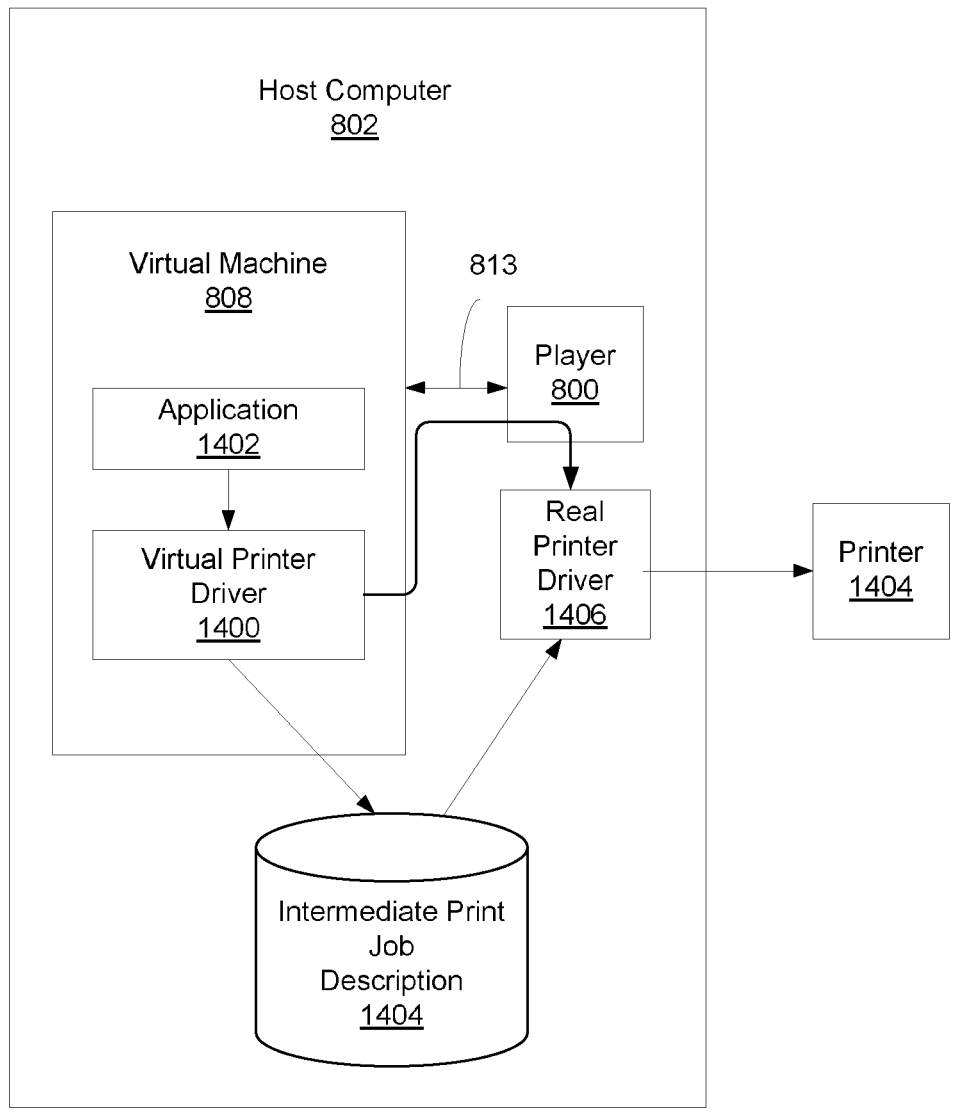
FIG. 14 is a block diagram of a printing system, in accordance with one embodiment of the present invention.

These and other shortcomings of the prior art can be overcome in either of two ways. According to the first way, as shown in FIG. 14, a virtual printer driver 1400 in the virtual machine 808 accepts print requests (print jobs) from application programs, such as application 1402, being executed by the virtual machine 808. The virtual printer driver 1400 converts the print job into a file 1404, such as a portable document format (PDF) file. The virtual printer driver 1400 stores the file 1404 in a convenient location, such as on the hard disk of the virtual computer 802 or in the virtual computer's main memory (such as in a "RAM drive"). The virtual printer driver 1400 then sends information about the file and the contents of the file 1404 to the player 800 being executed on the host computer 802. The player 800 on the host computer 802 then queues the file 1404 for printing on any printer that is accessible by the host computer 802. The accessible printers include directly-connected printers (such as printer 1404), as well as network-connected printers (not shown). A conventional real printer driver 1406 executed by the host computer 802 handles printing the queued file 1404 in a well-known manner.

Figure 15:
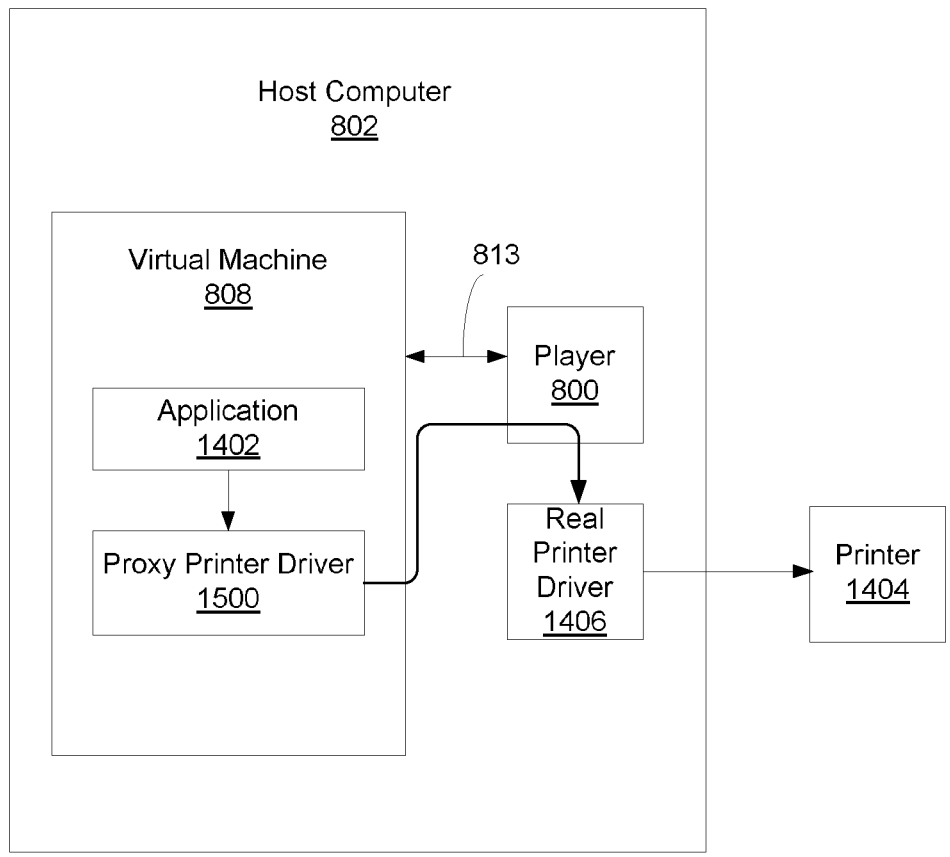
FIG. 15 is a block diagram of a printing system, in accordance with another embodiment of the present invention.

Alternatively, as shown in FIG. 15, a proxy printer driver 1500 is executed by the virtual machine 808. The proxy printer driver 1500 communicates with the real printer driver 1406, such as via the player 800 and the link 813 between the virtual machine 808 and the player 800. In this case, the proxy printer driver 1500 generates and sends graphic device interface (GDI) commands, or commands in another standard format, to the real printer driver 1406, and the real printer driver responds to the commands by printing contents on the printer 1404 or on a network-connected printer (not shown).

Optionally, the virtual printer driver 1400 or the proxy printer driver 1500 can log(audit) print requests. Thus, for each print request, the user and application that requested the print job, the requested printer, along with an identification of the files, patient, etc. that are to be printed, as well as the time and date, can be logged.

In addition, the virtual printer driver 1400 or the proxy printer driver 1500 can implement a security policy that limits which users and/or which applications can print data to a local printer outside the enterprise. Such limitations may be useful in meeting Health Insurance Portability and Accountability Act (HIPAA) requirements. In addition, if the printer driver 1400 or 1500 detects an unauthorized attempt to print data, the printer driver can send a message to a central server (not shown).

Automatic Token Authorization and Re-Authorization

Figure 16A:
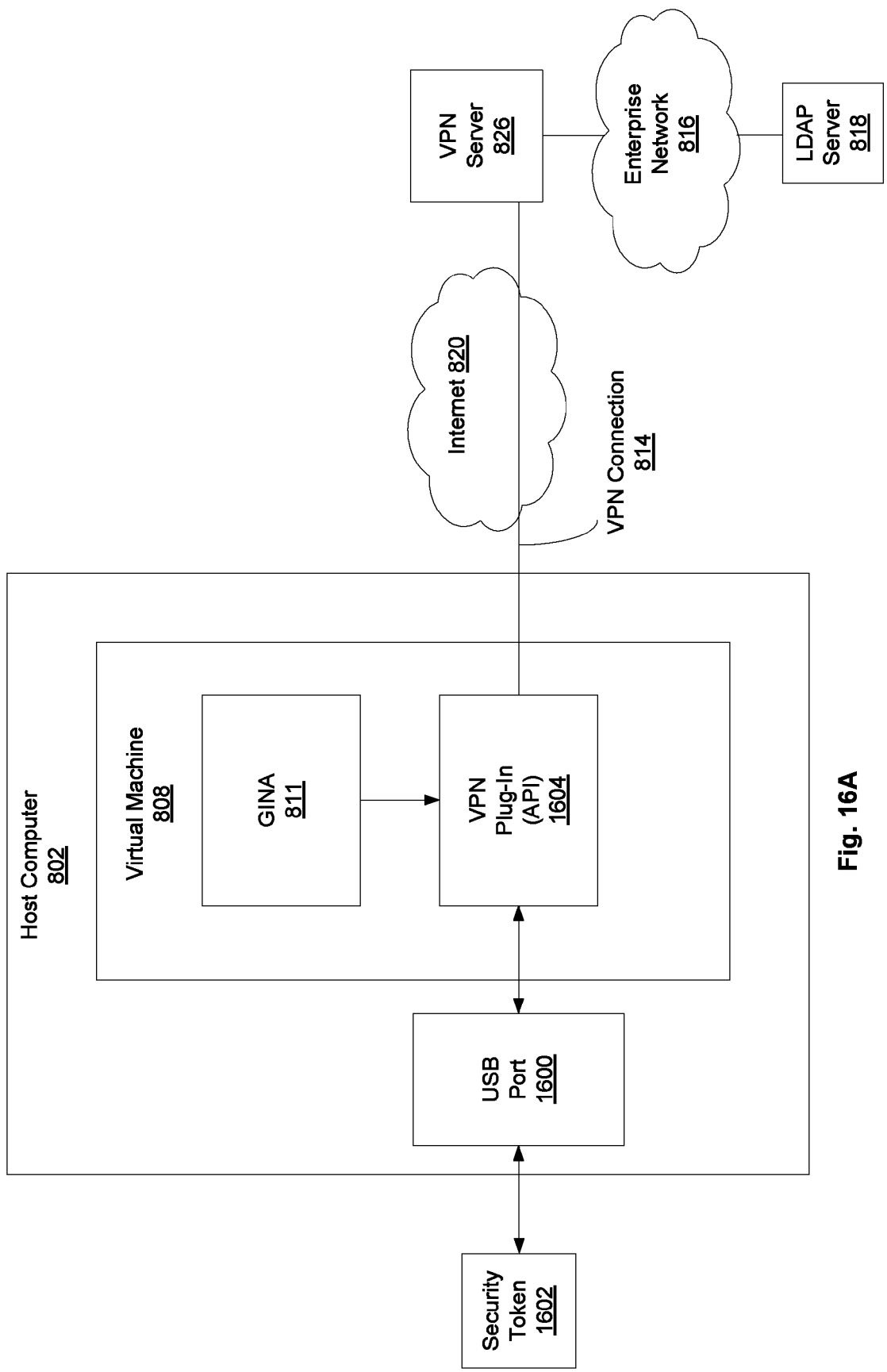
FIG. 16A is a block diagram of a virtual machine accessing a security token, in accordance with one embodiment of the present invention.

As noted, when a user logs on to a virtual machine, or when a VPN connection fails and is reestablished, and a fob, smartcard, or other device that contains user credentials is connected (such as via a USB port) to the host computer, the GINA 811 (or a plug-in component associated with the GINA 811) can automatically interrogate the fob or other device (collectively hereinafter "fob") for the user credentials. This interrogation can be accomplished using either of two schemes. In the first scheme, as shown in FIG. 16A, the port (such as a USB port 1600) is "passed through" to the virtual machine 808. That is, control of the port 1600 is taken away from the host operating system and given to the operating system being executed on the virtual machine 808. The port 1600 is, therefore, accessible by software being executed by the virtual machine 808, and the GINA 811 (or the plug-in component 1604) accesses the fob 1602 via the port 1600.

In the second scheme, as shown in FIG. 16B, the host computer 802 maintains control of the port 1600, and the player 800 or another component being executed by the host computer 802 reads information from the fob 1602 and passes the information to the GINA 811 (or the plug-in component 1604). As noted, one or more software components being executed by the virtual computer 808 establish a communication link 813 with the player 800. The GINA 811 (or the plug-in component 1604) requests user credentials or other information from the fob 1602 via this communication link 813.

Integrating Login Information with Host Operating System

Figure 17:
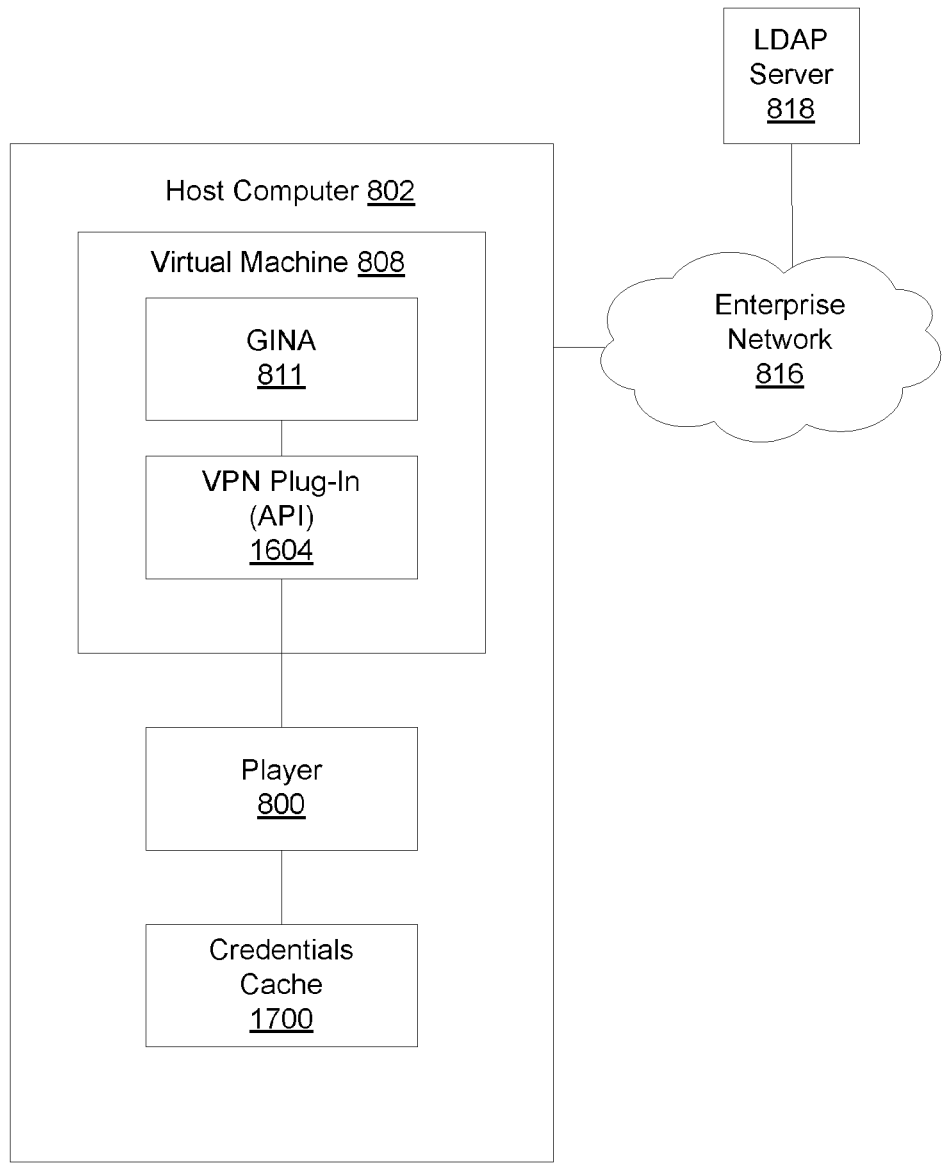
FIG. 17 is a block diagram of a virtual machine accessing user credentials in a host computer, in accordance with one embodiment of the present invention.

The GINA 811 has been described as prompting for a username and password as part of an authentication procedure. Optionally or alternatively, the GINA 811 can query the host operating system for credentials related to the user that is logged in to the host operating system. For example, as shown in FIG. 17, if the host computer 802 is part of a domain, and the host computer 802 accesses an identity store, such as an LDAP server 818, to authenticate the user, and the virtual machine 808 is joined to the same domain, the virtual machine 808 can query the host operating system, such as a credentials cache 1700, for the user's credentials. These credentials can take the form of a copy of the user's Kerberos ticket, for example.

If the host computer 802 is part of a domain, and the host computer is trusted by the virtual machine 808 to adequately maintain security, the virtual machine 808 can allow some interaction between the host computer 802 and the virtual machine 808 that would be otherwise prohibited. For example, clipboard copy-and-paste or drag-and-drop operations between the host computer 802 and the virtual machine 808 may be permitted.

Parallel Sessions with an Integrated Access Server

In hospitals, clinics, doctors' offices and the like, healthcare providers often use several computer application programs to access patient data. For example, one application may provide blood test results, another application may provide x-ray images and a third application may provide biopsy test results. Typically, each of these applications requires the healthcare provider to enter user credentials and to identify a patient of interest. An "integrated access server" enables the healthcare provider to log on once and access several applications. (This is commonly referred to as a "context management architecture" (CMA).)

The integrated access server provides the user's credentials to each of the applications. In addition, after the user enters a patient identification, the integrated access server provides this information to each of the applications, so the healthcare provider is ensured that all of the applications display results from the same patient. Typically, applications and the integrated access server operate according to a standard, such as the Clinical Context Management Specification (CCOW) An exemplary integrated access server is the Vergence system from Sentillion, Inc., Andover, Mass. 01810.

Figure 18:
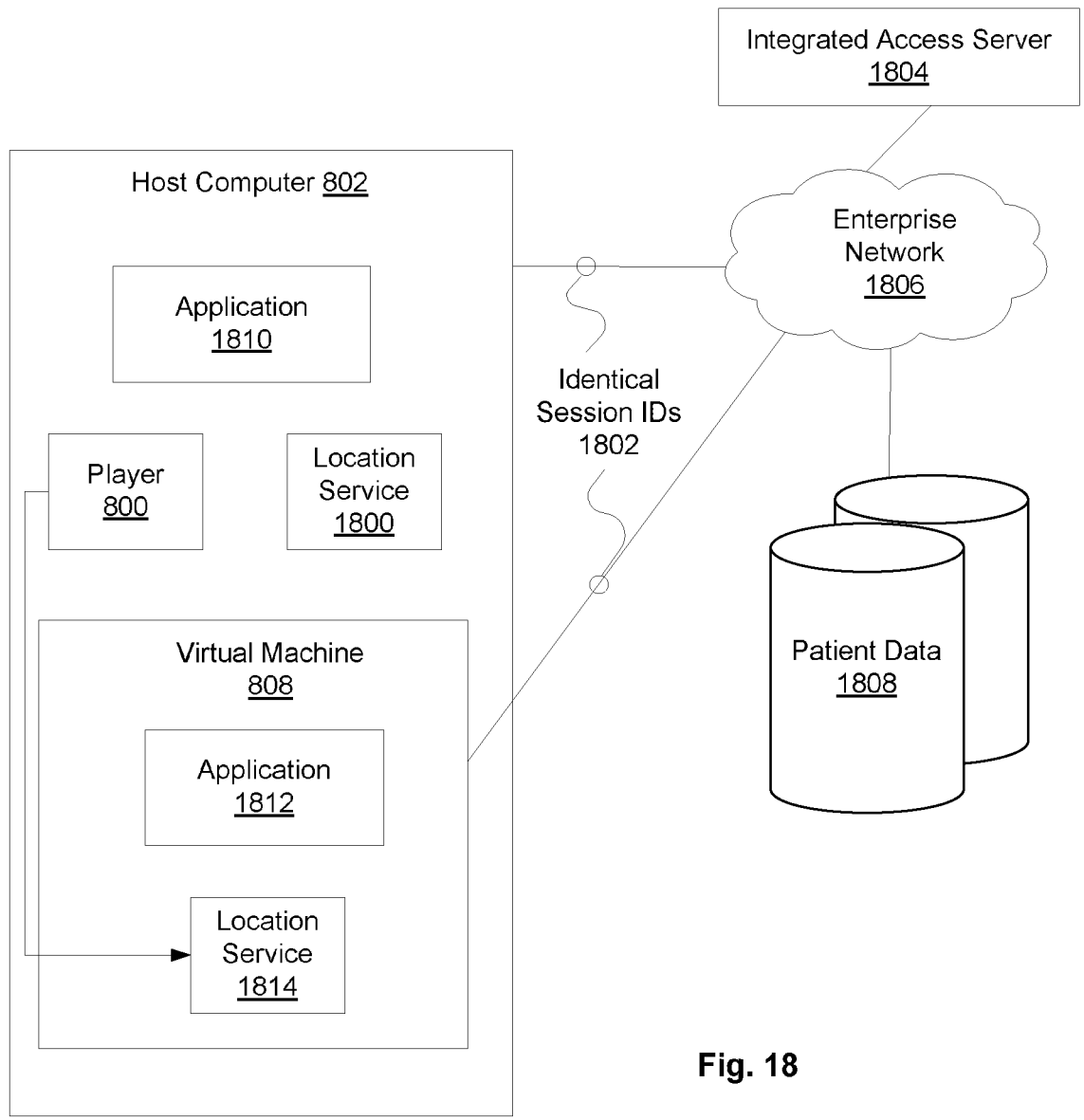
FIG. 18 is a block diagram of a host computer and a virtual machine accessing an integrated access server, in accordance with one embodiment of the present invention.

Typically, each computer used by a healthcare provider executes a location service 1800, as shown in FIG. 18. After the user enters his or her credentials, the location service 1800 provides an identification of the user's computer 802, such as the computer's media access control (MAC) address. The user's credentials, together with the computer's identification, form a "session ID" 1802. This session ID is sent to the integrated access server 1804, and the integrated access server 1804 provides access via an enterprise network 1806 to a shared "data context" session, which then enables the application to access the patient data 1808.

However, a virtual machine 808 has a MAC address that is distinct from the host computer's MAC address. Consequently, according to the prior art, the session ID of the host computer 802 is different than the session ID of the virtual machine 808. Thus, the integrated access server 1804 treats the accessing application 1810 on the host computer 802 as being in a different session than the accessing application 1812 of the virtual machine 808.

In one embodiment of the present invention, the location service 1814 on the virtual machine communicates with the player 800 and ascertains the identification (such as the MAC address) of the host computer 802 or the session ID used by the host computer 802. Thus, the location service 1814 on the virtual machine 808 generates a session ID that is substantially identical to the session ID used by the host computer 802. Consequently, the integrated access server 1804 treats the session of the application 1810 on the host computer 802 as being the same as the session of the application 1812 on the virtual machine 808. Of course, the host computer 802 and the virtual machine 808 can each execute more than one application.

Figure 19:
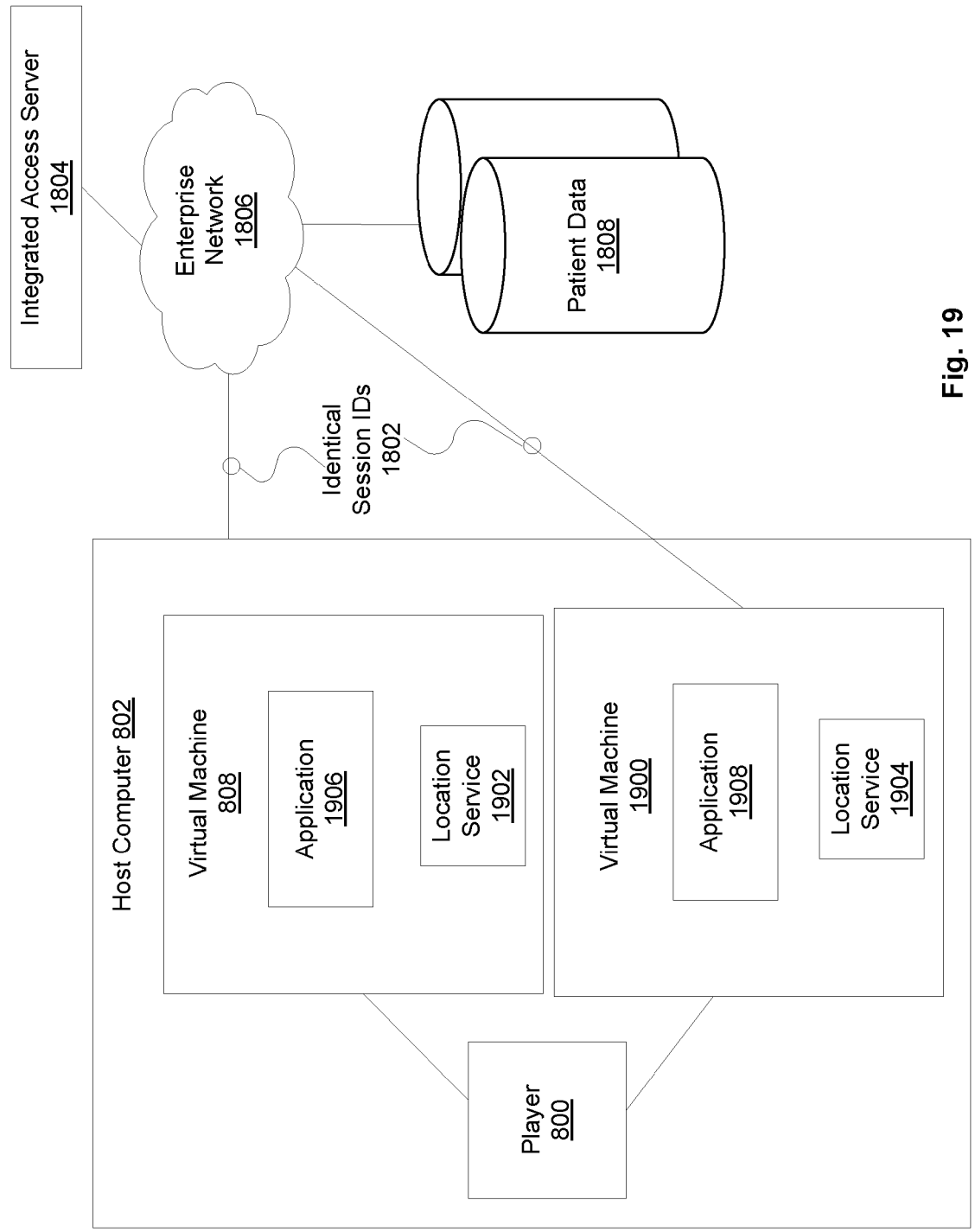
FIG. 19 is a block diagram of two virtual machines accessing an integrated access server, in accordance with one embodiment of the present invention.

Similarly, as shown in FIG. 19, more than one virtual machine 808 and 1900 can be hosted on a single host computer 802. In this case, the location services 1902 and 1904 in each of the virtual machines 808 and 1900 communicate with the player 800 being executed by the host computer 802. The player 800, or one of the location services 1902 or 1904, coordinates the session IDs used by the location services 1902 and 1904, such that both virtual machines 808 and 1900 have substantially identical session IDs. Consequently, the integrated access server 1804 treats the context session for the application 1906 (which is executed by one of the virtual machines 808) as the same context as another application 1908 (which is executed by the other virtual machine 1900).

Mapper (Coordinated Patient Identification to Multiple Integrated Access Servers)

Thus far, parallel sessions between two or more different (real and/or virtual) computers and a single integrated access server 1804 have been described. In these contexts, a patient identification entered by a user identifies a single patient, regardless of the number or mixture of application programs being executed by the computers.

A healthcare provider can, however, need to access information about a single patient, where the information is stored in the databases of two or more unaffiliated healthcare facilities. Consequently, a healthcare provider may need to interact with more than one integrated access server. However, each healthcare facility, and thus each integrated access server, maintains data on a different set of patients, and each integrated access server maintains its own set ("universe") of patient identifiers. Thus, for example, patient ID 8473625445 in one healthcare facility's database does not necessarily represent the same patient as in a different healthcare facility's database. Consequently, if parallel sessions are established to two or more different integrated access servers, according to the prior art, a user must enter a patient ID for each of the integrated access servers. Entering multiple patient IDs to access data for a single patient is, however, error-prone. If a healthcare provider inadvertently enters an incorrect patient ID, the healthcare provider would be presented with data about two different patients. Similarly, if a healthcare provider completes working on a first patient's data and then selects a second patient in an application that is connected to one of the integrated access servers, applications that are connected to the other integrated access server do not automatically change to the second patient.

Figure 20:
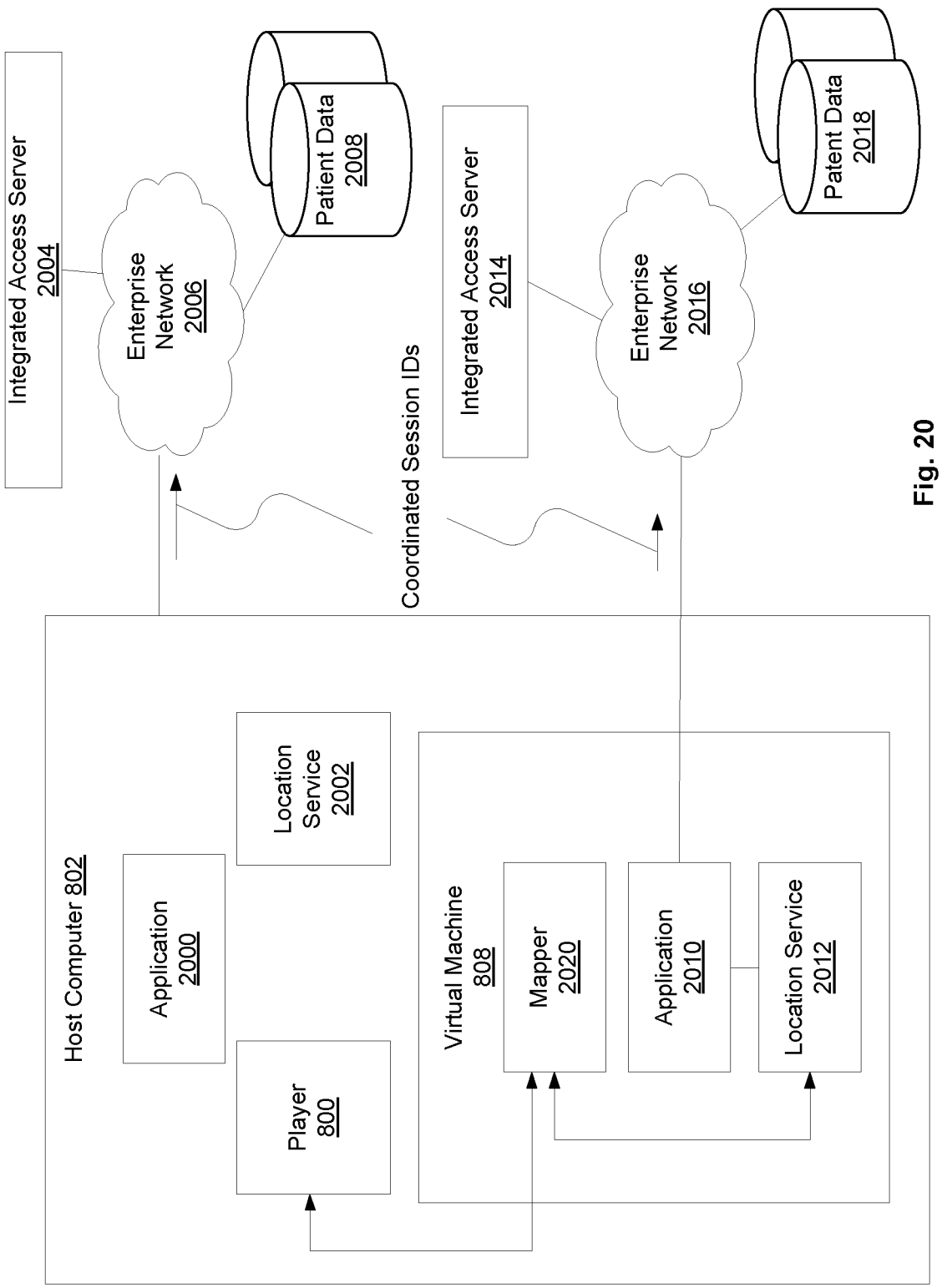
FIG. 20 is a block diagram of a host computer and a virtual machine accessing two separate integrated access servers, in accordance with one embodiment of the present invention.

FIG. 20 is a block diagram of a system that solves this problem. The system includes a host computer 802 and a virtual machine 808. An application 2000 and a location service 2002 are used to access a first integrated access server 2004 and a corresponding enterprise network 2006 and patient data 2008. A second application 2010 and a second location service 2012 executed by a virtual machine 808 access a second integrated access server 2014 and a corresponding second enterprise network 2016 and patient data 2018. Assume that the first integrated access server 2004, the first enterprise network 2006 and the first patient data 2008 are associated with a first healthcare facility that is not associated with the healthcare facility that maintains the second integrated access server 2014, the second enterprise network 2016 and the second patient data 2018. That is, a patient identification used in one of these healthcare facilities cannot be used in the other healthcare facility to request data about the same patient.

A "context participant" is executed by the virtual machine. The context participant joins the same context as the clinical applications and is able to detect any changes to that context that may occur, as well as make changes to that context. Additionally a context participant is executed on the host computer that wishes to synchronize context. The context participants communicate via the player 800 to notify each other of any changes made in other applications.

A "mapper" 2020 is executed by the virtual machine 808. The mapper 2020 maps or converts a patient identification that is used in one of the integrated access servers to a patient identification, for the same patient, that is used in the other integrated access server using a defined mechanism, such as the Agent interface defined by CCOW. Thus, if a user enters a patient identification into one of the applications 2000 or 2010, the mapper 2020 converts the patient identification, such that the other of the applications 2010 or 2000 displays information about the same patient, despite the fact that the information is fetched for the two applications from unaffiliated medical facilities. The patient IDs, user IDs and other context data sent to the multiple integrated access services 2004 and 2014, and that should be synchronized, are said to be "coordinated."

Figure 21:
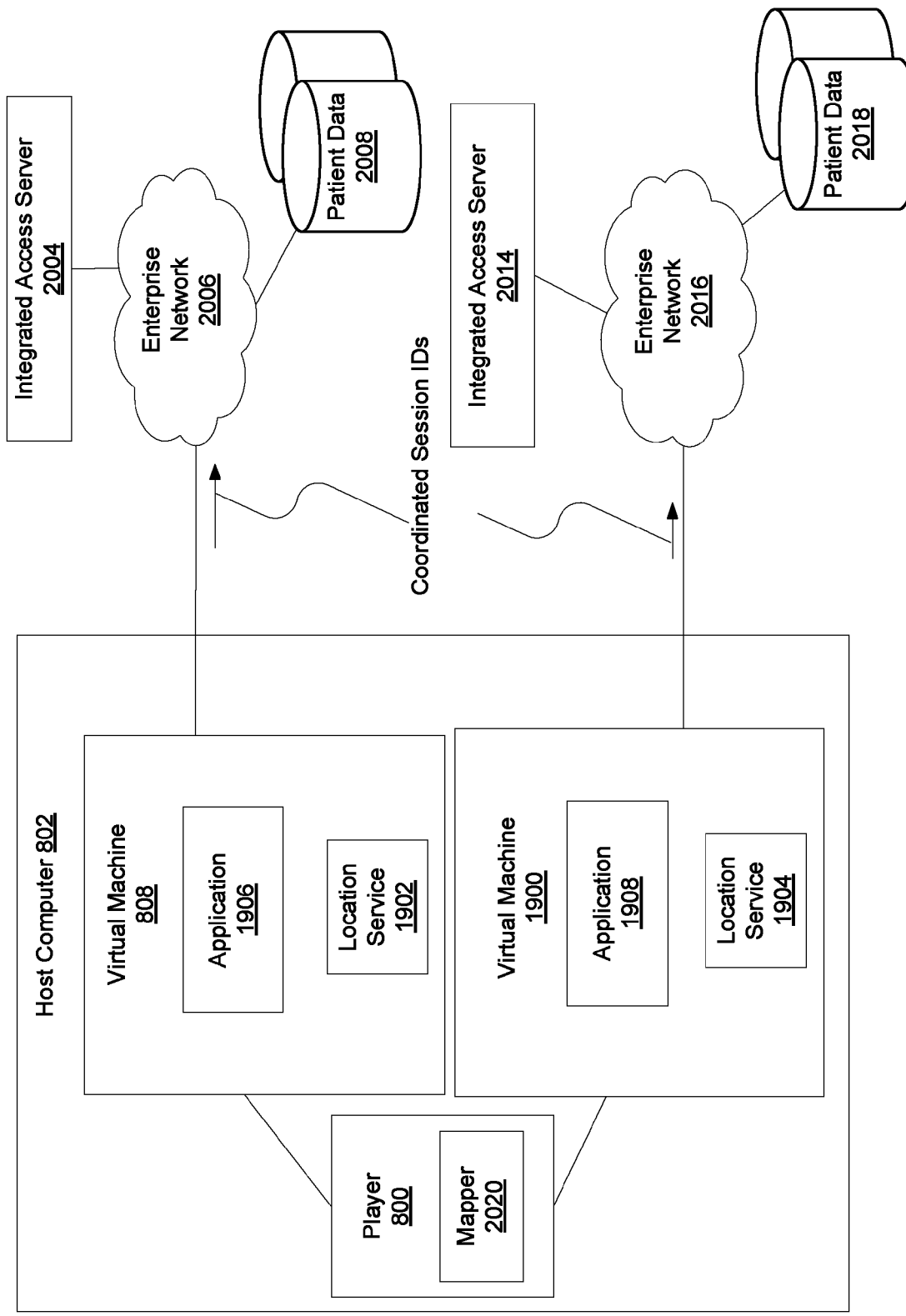
FIG. 21 is a block diagram of two virtual machines accessing two separate integrated access servers, in accordance with one embodiment of the present invention.

In alternative embodiments, the mapper 2020 can be executed by the host computer 802, or the mapper 2020 can be included in the player 800, in the location service 2002 or 2012 or in another component. For example, as shown in FIG. 21, a host computer 802 executes two virtual machines 808 and 1900. Each virtual machine 808 and 1900 executes an application 1906 and 1908 and a location service 1902 and 1904. In this embodiment, the player 800 includes the mapper 2020.

Transferable (Suspended) Virtual Machines

Virtual machines have been described as being executed by host computers. In many situations, the user's provisioned virtual machine executes on the same host computer each time the user wishes to use an application that is executed by the virtual machine. Typically, after the user finishes using the application, the user logs out or shuts down the virtual machine. However, in other situations, it would be convenient to suspend the execution of a virtual machine on one host computer, transfer the virtual machine to another host computer and resume execution of the virtual machine on the other host computer. For example, a doctor may use a virtual machine to access clinical applications on a host computer in the doctor's office. If the doctor were to be called to an emergency room (ER), the doctor may find it convenient to be able to suspend the virtual machine on the office host computer and resume execution of the virtual machine on a computer in the ER, once the doctor reaches the ER.

Figure 22:
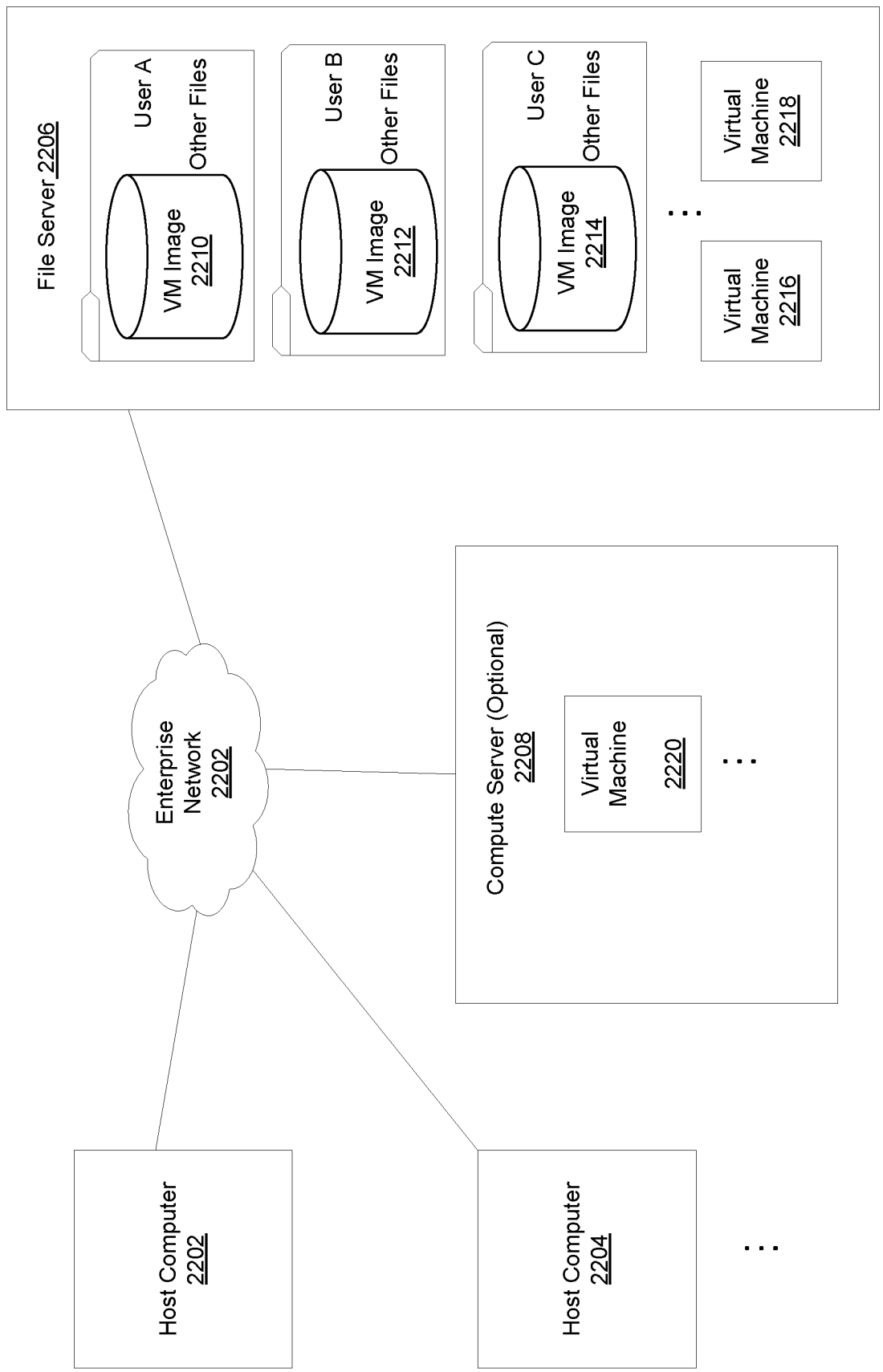
FIG. 22 is a block diagram of plural host computers connected to a file server that stores a plurality of virtual machine images, in accordance with one embodiment of the present invention.

FIG. 22 is a block diagram of a system that enables users to suspend execution of virtual machines and transfer the virtual machines to different (or back to the same) host computers. An enterprise network 2200 interconnects a plurality of host computers 2202, 2204, etc., a file server 2206 and (optionally) a compute server 2208. The file server 2206 stores a plurality of folders. Each folder can be associated with a particular user (such as User A, User B, User C, etc., as shown in FIG. 22), a particular function (such as general practitioner, nurse, physical therapist, etc.), or the folders can be organized in any other desired manner. Each folder stores a provisioned virtual machine image 2210, 2212, 2214, etc. That is, each virtual machine image 2210-2214 has been customized, as described above, for the respective user, function, etc. The folders can also store other files associated with the users, functions, etc.

When a user wishes to start a virtual machine, the appropriate virtual machine image 2210-2214 is read from the file server 2206 into the user's host computer 2202-2204. When the user wishes to suspend the virtual machine, the user issues a command, such as to the player (not shown in FIG. 22). The state of the virtual machine is then stored in the appropriate virtual machine image 2210-2214. The next time the user wishes to start the virtual machine, whether on the same host computer or on a different one of the host computers 2202-2204, the saved state of the virtual machine is loaded from the file server 2206 into the host computer the user wishes to use.

Optionally, the host computers 2202-2204 can be minimally configured. That is, the host computers 2202-2204 need not include mass storage devices, such as disks. Instead, the host computers 2202-2204 can start (bootstrap) using files stored on the file server 2206 and accessed via the enterprise network 2200. In addition, the host computers 2202-2204 can execute a minimal operating system, such as Linux, as long as the operating system supports execution of the player 800 (not shown).

Optionally or alternatively, the user can instruct the file server 2206 to resume the virtual machine, either directly after the virtual machine is suspended on the former host computer or at a predetermined time or upon the occurrence of a predetermined event. In this case, the saved state of the virtual machine is loaded from the file server 2206, and the file server 2206 is caused to execute the virtual machine, such as shown at 2216 or 2218. Similarly, the user can instruct the compute server 2208 to execute the virtual machine, as shown at 2220. In this way, the user can free up the host computer 2202-2204, and the virtual machine can continue executing on another host processor, such as on the file server 2206 or on the compute server 2208.

Optionally, if a predetermined type of virtual machine is suspended, the virtual machine is automatically transferred to the file server 2206 or the compute server 2208 to continue execution. For example, if the virtual machine executes media center software (such as the Windows XP Media Center operating system from Microsoft, Inc.), it may be desirable to automatically transfer a suspended virtual machine to another computer for execution, to minimize interruption of the entertainment (music, video, etc.) provided by the media center software.

If the user wishes to suspend execution of a virtual machine, but the user is not proximate the host computer that is executing the virtual machine (or the user cannot conveniently issue a command to the host computer), the user causes a remote procedure call to be placed to the host computer or a trigger file to be created in the appropriate folder on the file server 2206. The trigger file can contain commands to suspend execution of the virtual machine, or the mere existence of the file can cause the virtual machine to be suspended. For example, the player on a host computer executing a virtual machine can periodically, such as once per second, or occasionally check for the existence of, or read the contents of, the trigger file. If the trigger file exists or contains an appropriate command, the player suspends the virtual machine and stores the state of the virtual machine in the appropriate folder of the file server 2206.

Thus, continuing the previous example of the doctor who was called from his or her office to the ER, the doctor need not suspend the virtual machine before leaving his or her office. Instead, once the doctor reaches the ER, the doctor can issue a command on a host computer in the ER (such as logging in) to cause the trigger file to be created and the virtual machine (which is still executing on the doctor's office computer) to be suspended and transferred to the ER computer. In general, a user can request a suspended or executing virtual machine to be transferred to any convenient computer, such as to a computer located near the user's current location, or to a central computer, such as the file server 2206 or the compute server 2208.

Figure 23:
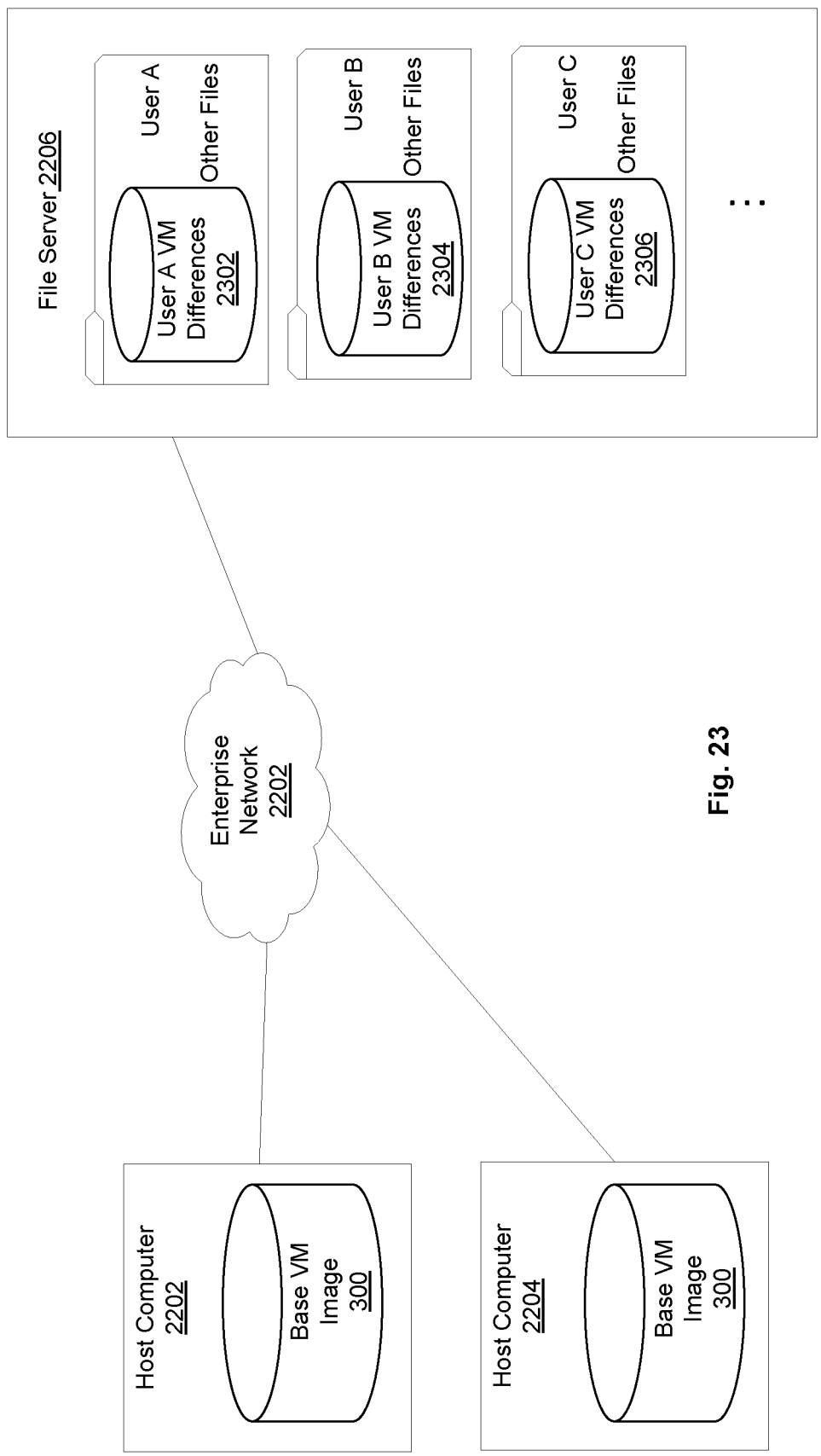
FIG. 23 is a block diagram of plural host computers connected to a file server that stores a plurality of virtual machine difference files, in accordance with one embodiment of the present invention.

Alternatively, as shown in FIG. 23, instead of storing each user's provisioned virtual machine image 2210-2214 on the file server 2206, each host computer 2202-2204 stores a generic base virtual machine image 300. (The generic base virtual machine image 300 is described above with reference to FIGS. 3 and 7.) In this case, when a virtual machine is first started, the virtual machine is provisioned (customized to the user), as described above. When the virtual machine is suspended or shut down, portions of the virtual machine image that are different from the base virtual machine image 300 are stored in the appropriate user's virtual machine differences file 2302, 2304 or 2306. Subsequently, when the virtual machine is restarted or resumed, the differences from the virtual machine difference file 2302-2306 are used, along with the base virtual machine image 300, to re-create the virtual machine.

Figure 24:
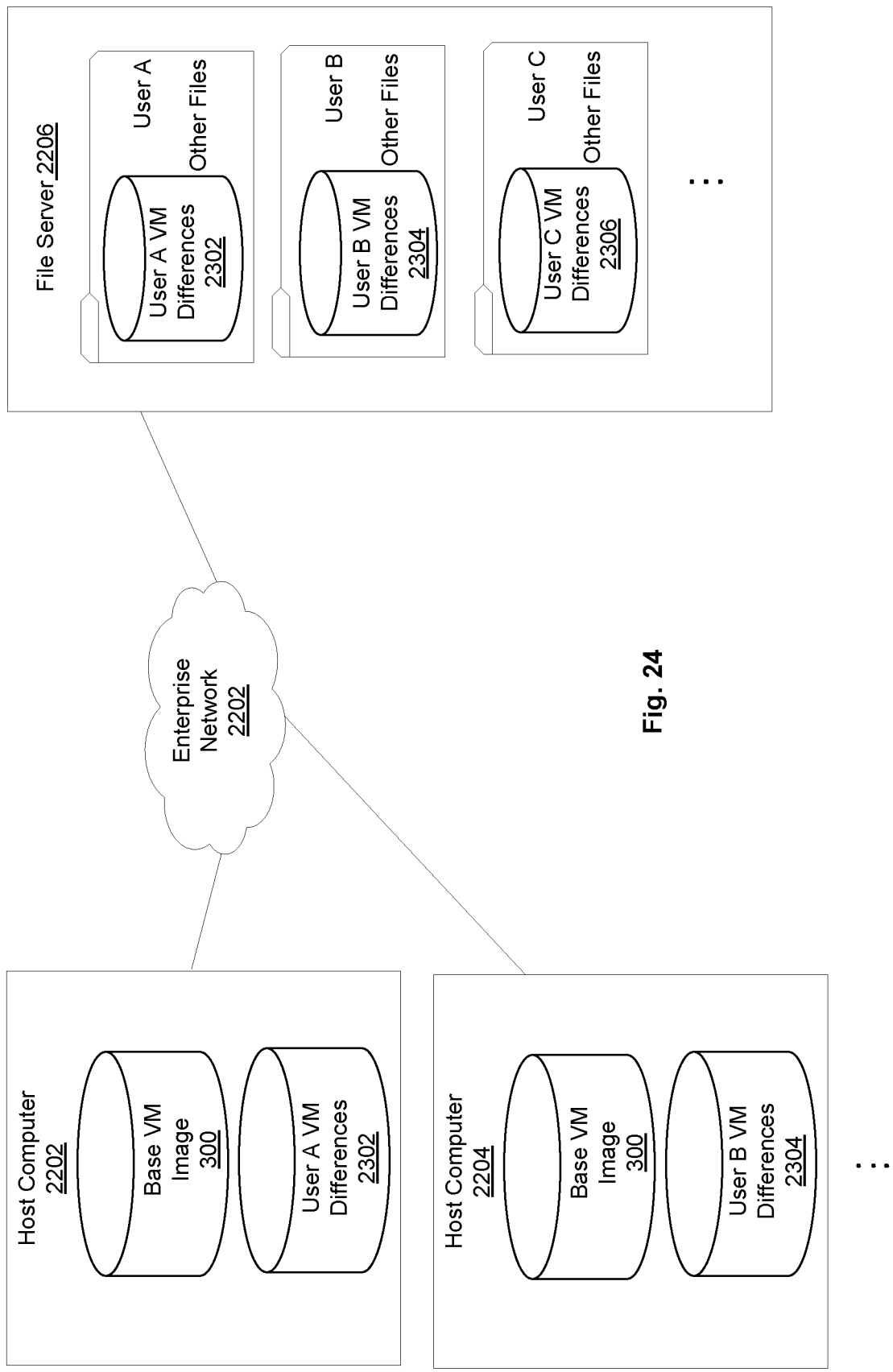
FIG. 24 is a block diagram of plural host computers that store respective virtual machine difference files, in accordance with one embodiment of the present invention.

Optionally, as shown in FIG. 24, the virtual machine difference files 2302-2306 can be stored on the respective host computers 2202, etc. instead of, or in addition to, storing these files on the file server 2206. If the virtual machine difference files 2302-2306 are stored on both the file server 2206 and on the host computers 2202, etc., these files should at least occasionally be synchronized.

A virtual machine project manager 304 creates a generic, i.e., not user-specific, virtual machine image file 300. Copies of this image file 300 may be distributed to one or more users, each of whom may then use an automated procedure to generate a user-specific virtual machine image file 806 and, thus, a user-specific virtual machine on his/her remote host computer. The generic virtual machine image file 300 may be distributed on computer-readable media, such as a DVD disks, or the file may be stored on a server and downloaded (such as via the Internet) by the users. Each user also receives or downloads a token 302, which contains a small amount of user-specific information that is used by the automated procedure to provision the generic virtual machine image file 300 for the particular user.

A virtual printer driver 1400 or proxy printer driver 1500 executed by a virtual machine 808 communicates with a real printer driver 1406 executed by a host computer 802 to enable application programs 1402 executed by the virtual machine 808 to print data on printers 1404 that are accessible by the host computer 802.

A virtual machine 808 accesses a security token 1602 connected to a host computer 802 to automatically authenticate or re-authenticate a user, such as when a virtual private network connection 814 is restarted. A virtual machine 808 accesses user credentials 1700 stored on a trusted host computer 802, to avoid redundantly requesting user logon information.

Substantially identical session identifiers 1802 are used by a host computer 802 and a virtual machine 808, or by two or more virtual machines 808 and 1900, when communicating to an integrated access server 1804. A mapper 2020 coordinates patient identifiers when a virtual machine 800 and a host computer 802, or two virtual machines 808 and 1900, communicate with two different integrated access servers 2004 and 2014.

A file server 2206 stores virtual machine images 2210-2214 that are accessed by a plurality of host computers 2202-2204. After a virtual machine is suspended from execution on one of the host computers 2202-2204, the state of the virtual machine is stored on the file server 2206. The virtual machine can, therefore, be transferred back to the same, or to another, host computer 2202-2204 to continue execution or to a compute server 2208. A host computer 2202-2204 stores a base (un-provisioned) virtual machine image 300, and a file server 2206 and/or the host computer 2202-2204 stores differences 2302-2306 between the un-provisioned virtual machine image 300 and the current state of the virtual machine.

Systems and methods above have been described with reference to a processor controlled by instructions stored in a memory. Some of the processes detailed above have been described with reference to flowcharts. Those skilled in the art should readily appreciate that functions, operations, decisions, etc. of all or a portion of each block, or a combination of blocks, of the flowcharts can be implemented as computer program instructions, software, hardware, firmware or combinations thereof. Those skilled in the art should also readily appreciate that instructions or programs defining the functions of the present invention can be stored or delivered to a processor in many forms, including, but not limited to, information permanently stored on non-writable, computer-readable media (e.g. read only memory devices within a computer, such as ROM, or devices readable by a computer I/O attachment, such as CD-ROM and DVD data disks), information alterably stored on writable, computer-readable media (e.g. floppy disks and hard drives) or information conveyed to a computer through communication media, including computer networks. In addition, while the invention may be embodied in software, the functions necessary to implement aspects of the invention may alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. Moreover, while the preferred embodiments are described in connection with various illustrative data structures, one skilled in the art will recognize that the system may be embodied using a variety of data structures. Accordingly, the invention should not be viewed as limited, except by the scope and spirit of the appended claims.

What is claimed is:

1. A method for configuring a virtual machine on a host computer, comprising:
    executing the virtual machine on the host computer by a host operating system;
    sending, by the host operating system, information to an operating system of the virtual machine, the information comprising an attribute of the host operating system or an attribute of the host computer;
    creating, by the operating system of the virtual machine, a system initialization file for the operating system of the virtual machine, the system preparation file based on the information;
    storing, by the operating system of the virtual machine, the system initialization file in a file system of the operating system of the virtual machine;
    starting the operating system of the virtual machine based on the system initialization file;
    associating an image file of the virtual machine with a user;
    authorizing, at the operating system of the virtual machine, the user with login credentials received from the host operating system as a result of starting the operation system of the virtual machine; and
    logging into a user account of the user on the operating system of the virtual machine, based on the login credentials.

2. The method of claim 1, further comprising:
restarting the virtual machine; and
processing, by the operating system of the virtual machine, the system initialization file as a result of restarting the virtual machine.

3. The method of claim 2, further comprising:
connecting to a virtual private network (VPN) based on the login credentials, as a result of logging into the user account.

4. The method of claim 3, further comprising:
receiving, by the operating system of the virtual machine, the login credentials from the host operating system; and
joining a domain of the VPN based on the login credentials.

5. The method of claim 4, further comprising:
storing the login credentials in the file system.

6. The method of claim 5, further comprising:
restarting the virtual machine; and
upon restarting the virtual machine, joining the domain by the operating system of the virtual machine with the stored login credentials.

7. The method of claim 1, wherein the information comprises:
a naming pattern of the host computer, a time zone where the host computer is located, a screen resolution of a display device attached to the host computer, a color depth of the display device, data determined from predefined rules, or a key for decrypting an encrypted image file of the virtual machine.

8. The method of claim 7, wherein the data determined from predefined rules comprises a memory size of the virtual machine.

9. The method of claim 1, wherein executing the virtual machine on the host computer by the host operating system includes:
    extracting the virtual machine from an image file, the image file comprising instructions and data for establishing a virtual private network (VPN) connection between the virtual machine and a computer environment; and
further comprising:
    connecting to a virtual private network (VPN) based on the instructions and data based on logging into a user account of the operating system of the virtual machine.

10. The method of claim 1, further comprising:
receiving, by the host computer, input indicative of powering down the virtual machine; and
in response to receiving the input, logging out of the operating system of the virtual machine instead of powering down.

11. A system, comprising:
a computing device; and
a memory communicatively coupled to the computing device bearing computer-executable instructions that, when executed on the computing device, cause the computing device to perform operations comprising:

executing the virtual machine on the computing device by a host operating system;

sending, by the host operating system, information to a operating system of the virtual machine, the information comprising an attribute of the host operating system or an attribute of a host computer;

creating, by the operating system of the virtual machine, a system initialization file for the guest operating system, of the virtual machine the system initialization file based on the information;

storing, by the operating system of the virtual machine, the system initialization file in a file system of the operating system of the virtual machine;

starting the operating system of the virtual machine of the virtual machine based on the system initialization file;

associating an image file of the virtual machine with a user;

authorizing, at the operating system of the virtual machine, the user with login credentials received from the host operating system as a result of starting the operation system; and logging into a user account of the user on the operating system of the virtual machine, based on the login credentials.

12. The system of claim 11, further bearing computer-executable instructions that, when executed on the computing device, cause the computing device to perform operations comprising:

restarting the virtual machine; and processing, by the operating system of the virtual machine, the system initialization file as a result of restarting the virtual machine.

13. The system of claim 12, further bearing computer-executable instructions that, when executed on the computing device, cause the computing device to perform operations comprising:

connecting to a virtual private network (VPN) based on the login credentials, as a result of logging into the user account.

14. The system of claim 13, further bearing computer-executable instructions that, when executed on the computing device, cause the computing device to perform operations comprising:

receiving, by the operating system of the virtual machine, the login credentials from the host operating system; and joining a domain of the VPN based on the login credentials.

15. The system of claim 14, further bearing computer-executable instructions that, when executed on the computing device, cause the computing device to perform operations comprising:

storing the login credentials in the file system.

16. The system of claim 15, further bearing computer-executable instructions that, when executed on the computing device, cause the computing device to perform operations comprising:

restarting the virtual machine; and upon restarting the virtual machine, joining the domain by the operating system of the virtual machine with the stored login credentials.

17. The system of claim 11, wherein the information comprises:

a naming pattern of the host computer, a time zone where the host computer is located, a screen resolution of a display device attached to the host computer, a color depth of the display device, data determined from predefined rules, or a key for decrypting an encrypted image file of the virtual machine.

18. The system of claim 17, wherein the data determined from predefined rules comprises a memory size of the virtual machine.

19. The system of claim 11, wherein executing the virtual machine on the host computer by the host operating system includes:

extracting the virtual machine from an image file, the image file comprising instructions and data for establishing a virtual private network (VPN) connection between the virtual machine and a computer environment; and further bearing computer-executable instructions that, when executed on the computing device, cause the computing device to perform operations comprising:

connecting to a virtual private network (VPN) based on the instructions and data based on logging into a user account of the operating system of the virtual machine.

20. The system of claim 11, further bearing computer-executable instructions that, when executed on the computing device, cause the computing device to perform operations comprising:

receiving, by the host computer, input indicative of closing a user interface window of the virtual machine; and in response to receiving the input, logging out of the operating system of the virtual machine.

21. A storage device bearing computer-readable instructions that, when executed on a computing device, cause the computing device to perform operations comprising:

executing the virtual machine on the computing device by a host operating system;

sending, by the host operating system, information to a operating system of the virtual machine, the information comprising an attribute of the host operating system or an attribute of the computing device;

creating, by the operating system of the virtual machine, a system initialization file for the operating system of the virtual machine, the system initialization file based on the information;

storing, by the operating system of the virtual machine, the system initialization file in a file system of the operating system of the virtual machine;

starting the operating system of the virtual machine based on the system initialization file;

associating an image file of the virtual machine with a user;

authorizing, at the operating system of the virtual machine, the user with login credentials received from the host operating system as a result of starting the operation system of the virtual machine; and logging into a user account of the user on the operating system of the virtual machine, based on the login credentials.

22. The storage device of claim 21, further bearing computer-executable instructions that, when executed on the computing device, cause the computing device to perform operations comprising:

restarting the virtual machine; and processing, by the operating system of the virtual machine, the system initialization file as a result of restarting the virtual machine.

23. The storage device of claim 22, further bearing computer-executable instructions that, when executed on the computing device, cause the computing device to perform operations comprising:

connecting to a virtual private network (VPN) based on the login credentials, as a result of logging into the user account.

24. The storage device of claim 23, further bearing computer-executable instructions that, when executed on the computing device, cause the computing device to perform operations comprising:
   receiving, by the operating system of the virtual machine, login credentials from the host operating system; and
   joining a domain of the VPN based on the login credentials.

25. The storage device of claim 24, further bearing computer-executable instructions that, when executed on the computing device, cause the computing device to perform operations comprising:
   storing the login credentials in the file system.

26. The storage device of claim 25, further bearing computer-executable instructions that, when executed on the computing device, cause the computing device to perform operations comprising:
   restarting the virtual machine; and
   upon restarting the virtual machine, joining the domain by the operating system of the virtual machine with the stored login credentials.

27. The storage device of claim 21, wherein the information comprises:
   a naming pattern of the computing device, a time zone where the computing device is located, a screen resolution of a display device attached to the computing device, a color depth of the display device, data determined from predefined rules, or a key for decrypting an encrypted image file of the virtual machine.

28. The storage device of claim 27, wherein the data determined from predefined rules comprises a memory size of the virtual machine.

29. The storage device of claim 21, wherein executing the virtual machine on the computing device by the host operating system includes:
   extracting the virtual machine from an image file, the image file comprising instructions and data for establishing a virtual private network (VPN) connection between the virtual machine and a computer environment; and
   further bearing computer-executable instructions that, when executed on the computing device, cause the computing device to perform operations comprising:
      connecting to a virtual private network (VPN) based on the instructions and data based on logging into a user account of the operating system of the virtual machine.

30. The storage device of claim 21, further bearing computer-executable instructions that, when executed on the computing device, cause the computing device to perform operations comprising:
   receiving, by the computing device, input indicative of closing a user interface window of the virtual machine; and
   in response to receiving the input, logging out of the operating system of the virtual machine.

* * * * *